(12) United States Patent
Harris

(10) Patent No.: US 12,357,441 B2
(45) Date of Patent: Jul. 15, 2025

(54) APPARATUS AND METHOD FOR THE TREATMENT OF TOOTH DECAY, GUM DISEASE, AND OTHER MEDICAL CONDITIONS

(71) Applicant: Charles E. Harris, Chiang Rai (TH)

(72) Inventor: Charles E. Harris, Chiang Rai (TH)

( * ) Notice: Subject to any disclaimer, the term of this patent is extended or adjusted under 35 U.S.C. 154(b) by 0 days.

(21) Appl. No.: 18/688,642

(22) PCT Filed: Sep. 2, 2022

(86) PCT No.: PCT/US2022/042472
§ 371 (c)(1),
(2) Date: Mar. 1, 2024

(87) PCT Pub. No.: WO2023/034578
PCT Pub. Date: Mar. 9, 2023

(65) Prior Publication Data
US 2024/0374365 A1     Nov. 14, 2024

Related U.S. Application Data

(60) Provisional application No. 63/240,896, filed on Sep. 4, 2021.

(51) Int. Cl.
*A61C 19/06*     (2006.01)
(52) U.S. Cl.
CPC .................. *A61C 19/063* (2013.01)
(58) Field of Classification Search
CPC ... A61C 19/063; A61C 17/0211; A61C 17/02; A61C 17/0208; A61C 17/022
See application file for complete search history.

(56) References Cited

U.S. PATENT DOCUMENTS 2,957,476 A * 10/1960 Freeman ............ A61C 17/0208
433/88
3,566,869 A * 3/1971 Crowson ............ A61C 17/0211
604/320
(Continued)

OTHER PUBLICATIONS

WIPO, International Search Reported issued in International Patent Application No. PCT/US2022/042472, mailed Dec. 30, 2022.
(Continued)

*Primary Examiner* — Ralph A Lewis
(74) *Attorney, Agent, or Firm* — Kim IP Law Group LLC

(57) ABSTRACT

A device for and method of delivering a therapeutic fluid to the oral cavity of a user. The device includes a source of pressurized therapeutic fluid and a mouthpiece. The mouthpiece has a posterior facing end, and a body having a first surface for enabling the user's lips to seal the oral cavity from an external environment when the mouthpiece is received in the oral cavity. The mouthpiece comprises an inlet passageway and an outlet passageway extending through the body and in fluid communication with the posterior facing end, wherein the inlet passageway delivers a therapeutic fluid under pressure to the oral cavity and the outlet passageway enables egress of the therapeutic fluid from the oral cavity. The device can also include a reservoir for receiving saliva generated by the user that may be recirculated along with the therapeutic fluid to the oral cavity.

27 Claims, 19 Drawing Sheets

(56) References Cited

U.S. PATENT DOCUMENTS

| | | | | |
|---|---|---|---|---|
| 3,669,101 | A | * | 6/1972 | Kleiner ............... A61C 17/032 604/150 |
| 4,865,021 | A | * | 9/1989 | Siderman ............. A61C 19/06 433/80 |
| 5,104,315 | A | * | 4/1992 | McKinley ........... A61C 17/0211 433/80 |
| 6,893,259 | B1 | * | 5/2005 | Reizenson ......... A61C 17/0211 433/29 |
| 2012/0021375 | A1 | * | 1/2012 | Binner ................. A61B 5/097 433/89 |
| 2012/0219926 | A1 | * | 8/2012 | Sullivan ............. A61C 17/0211 433/80 |
| 2017/0056143 | A1 | * | 3/2017 | Hyun .................... A61C 17/024 |
| 2017/0079746 | A1 | * | 3/2017 | Sanders .................... A61C 5/90 |
| 2019/0231499 | A1 | * | 8/2019 | Laurent ............... A61C 17/0208 |
| 2020/0155288 | A1 | * | 5/2020 | Sanders ............... A61C 19/063 |
| 2024/0374365 | A1 | * | 11/2024 | Harris ................ A61C 19/063 |

OTHER PUBLICATIONS

WIPO, Written Opinion issued in International Patent Application No. PCT/US2022/042472, mailed Dec. 30, 2022.

YouTube, Dental Treatment: Minimally Invasive Periodontal Therapies Dec. 4, 2017, https://www.youtube.com/watch?v=7xE5dh8qF8M, Dec. 4, 2017.

YouTube, Demonstration Video of Lime Technologies Ozone Therapy in Dentistry Stops and Reverses Tooth Decay, https://www.youtube.com/watch?v=2SzjUrFbfkw&t=261s, Oct. 9, 2008.

YouTube, Dry Mouth: Causes, Symptoms and Treatment—SLUCare Otolaryngology, https://www.youtube.com/watch?v=jrLx7gEDrjM&ab_channel=DeltaDentalofNewJerseyandConnecticut, Oct. 28, 2020.

YouTube, https://www.youtube.com/watch?v=26a8Hod0ww&ab_channel=MarcDiNolaMarcDiNola, Jun. 27, 2020.

YouTube, Ozone Therapy in Dentistry, https://www.youtube.com/watch?v=P6z7usgEyO4&t=4s&ab_channel=MoonlightBeachDental, Jun. 12, 2018.

YouTube, Ozone Therapy With Dr. Kelly Misch, https://www.youtube.com/watch?v=fFIX6vPZocM&ab_channel=Michiganimplants%26Periodontics, Dec. 17, 2020.

YouTube, Ozone Treatment with Dr. Sanda Moldovan| Over 40, https://www.youtube.com/watch?v=-zsEDr3dfcA, Mar. 13, 2018.

YouTube, Ozone Therapy at the Dental Office, https://www.youtube.com/watch?v=Dfi7VClzcJc, Dec. 3, 2019.

YouTube, Ozonated water irrigation with a handpiece, https://www.youtube.com/watch?v=Jtbf6WDjyUo&ab_channel=FadiSabbah, Mar. 26, 2017.

YouTube, Ozone tray seal test, https://www.youtube.com/watch?v=PrwFrLV7a7l&ab_channel=FadiSabbah, Mar. 31, 2017.

YouTube, Applicationofozonewithtrays.AVI, https://www.youtube.com/watch?v=I-LjmJT1eD0, Jun. 22, 2011.

YouTube, Dr. Rainey DDS Ozone Tray, https://www.youtube.com/watch?v=eD4CbHg7VS8, Dec. 18, 2019.

YouTube, TIADS Ozone Trays Trays, https://www.youtube.com/watch?v=hE_2XkuWFRU, Feb. 26, 2020.

YouTube, Oxygen Ozone Therapy in Dentistry, https://www.youtube.com/watch?v=oAJmirRGRso&ab_channel=DentistChannel.OnlineDentistChannel.Online, May 28, 2021.

YouTube, Philip Mollica, DMD: The Use of Oxygen/Ozone for Gum Disease IAOMT Chicago 2008, https://www.youtube.com/watch?v=uCINRpn3wAk, Aug. 8, 2011.

YouTube, What is the Ozone Dental Mouthpiece? Ozone Dentistry Tools, https://www.youtube.com/watch?v=T7OVzaG_TPO, Mar. 15, 2021.

YouTube, The Ozone Dental Mouthpiece with Marius Herzog, https://www.youtube.com/watch?v=BD10p2-5HCA, Apr. 23, 2021.

YouTube, Dr. Ozone: 40 Years Using Medical Ozone To Fix Everything: Frank Shallenberger #524 (Full Episode), https://www.youtube.com/watch?v=oHQBSnszTIA&ab_channel=Bulletproof, Sep. 6, 2018.

YouTube, Hyperbaric oxygen therapy helps patients heal faster—Medical Minute, https://www.youtube.com/watch?v=7jKH89zKVuU&ab_channel=AveraHealth, Sep. 17, 2018.

YouTube, Hyperbaric Medicine—Dr Shai Efrati at Exponential Medicine 2019, https://www.youtube.com/watch?v=r0iQFWjw_LY&ab_channel=ExponentialMedicine, Nov. 18, 2020.

Srikanth A, Sathish M, Sri Harsha AV. Application of ozone in the treatment of periodontal disease. J Pharm Bioallied Sci. Jun. 2013;5(Suppl 1):S89-94. doi: 10.4103/0975-7406.113304. PMID: 23946585, PMCID: PMC3722714.

Kammer, Chris, Dental ozone: The revolution is happening here!, https://www.dentaleconomics.com/science-tech/oral-medicine-anesthetics-and-the-oral-systemic-connection/article/16389313/dental-ozone-the-revolution-is-happening-here, Dental Economics, Feb. 2, 2009, retrieved Jun. 4, 2024.

National Cancer Institute, https://www.cancer.gov/publications/dictionaries/cancer-terms/def/palate, retrieved Jun. 4, 2024.

Copeland, Cynthia. Ozone tray for teeth, https://www.wholehealthdds.com/ozone-tray-for-teeth/, Online blog, retrieved Jun. 4, 2024.

"Medozon Mouth Tray", https://dotoloeurope.com/product/medozon-mouth-tray-ozone-dental-application/, retrieved Jun. 4, 2024.

"Ozone Tray Refills (Packs Of 5 Trays)", https://tiads.com/collections/ozone-trays/products/ozone-tray-refills- packs-of-5-trays, retrieved Jun. 4, 2024.

Kinman, Tricia, Sublingual and Buccal Medication Administration, https://www.healthline.com/health/sublingual-and-buccal-medication-administration, Jun. 7, 2017, retrieved Jun. 4, 2024.

Lowe, Micah. Everything You Need to Know About Ozone Therapy, https://nycim.com/everything-you-need-to-know-about-ozone-therapy/, retrieved Jun. 4, 2024.

International Search Reported issued in International Patent Application No. PCT/US2022/042472, mailed Dec. 30, 2022.

Written Opinion issued in International Patent Application No. PCT/US2022/042472, mailed Dec. 30, 2022.

* cited by examiner

APPARATUS AND METHOD FOR THE TREATMENT OF TOOTH DECAY, GUM DISEASE, AND OTHER MEDICAL CONDITIONS

FIELD OF INVENTION

The subject disclosure relates in general to a dental and medical devices and methods, and more specifically to devices and methods for the prevention and treatment of tooth decay, gum and periodontal disease, as well as various medical conditions and illnesses in the human body.

BACKGROUND OF THE INVENTION

Current technologies in the dental field strain to successfully address the prevalence of tooth decay and gum disease in the general population. Millions of Americans and billions around the world suffer from oral diseases caused mainly by an overgrowth of pathogenic bacteria which create an acidic toxic environment in the mouth. In every demographic, over half the population is affected. Oral diseases can cause and exacerbate chronic diseases and systemic inflammation and lead to complications from many communicable diseases such as Covid-19. Studies also show that eradicating oral pathogenic bacteria greatly reduces the likelihood of systematic infections and inflammation throughout the body (heart, brain, liver, etc.).

Oral pathogens and infected cells trigger the release of inflammatory markers such as Interleukin 6 (IL-6), CRP, and other cytokines, as well as the mobilization of macrophages, neutrophils, T cells, etc. Studies have shown that elevated levels of Il-6 and CRP can even predict the severity of a Covid-19 infection. However, maintaining a balanced oral flora and keeping oral pathogens at bay is a multifactorial process. It requires careful oral hygiene, regular medical and dental check-ups, and a healthy lifestyle.

An advantage exists, therefore, for devices and methods of effectively delivering a therapeutic fluid to the entire oral cavity of a user for eradicating oral pathogenic pathogens, restoring the balance of the oral microbiota, healing oral tissues, and dissolving such fluids into surrounding tissues and into the cardiovascular system.

SUMMARY OF THE INVENTION

The subject disclosure addresses the root cause of tooth decay and gum disease by both preventing and treating oral diseases, stopping the spread of oral pathogens from getting into the bloodstream, and preventing them from transferring from one person to another and even to the unborn.

In accordance with an exemplary embodiment there is provided a device for delivering a therapeutic fluid to an oral cavity of a user comprises a source of pressurized therapeutic fluid and a mouthpiece. The mouthpiece has a posterior facing end for aligning with a front of a user's oral cavity, and a body extending from the posterior facing end, the body having a lip engaging surface for sealing the oral cavity from an external environment when the lip engaging surface is engaged by a user's lips. The mouthpiece further includes an inlet passageway coupled to the source of pressurized fluid, the inlet passageway extending through the body and in fluid communication with the posterior facing end for delivering the pressurized therapeutic fluid to the oral cavity when the oral cavity is sealed from the external environment by a user's lips in engagement with the lip engaging surface.

According to an aspect, the lip engaging surface includes a recess for receiving a user's lip to provide a fluid seal when the user's lip is received in the recess. According to another aspect, the body tapers in an anterior direction. According to another aspect, the body is a hollow body having an insert plug removably received in the hollow body, and wherein the inlet passageway and the outlet passageway are provided in the insert plug. According to another aspect, the mouthpiece includes a plurality of holes each in fluid communication with the inlet passageway for enabling the therapeutic fluid to be directed to a plurality of areas in the oral cavity. According to another aspect, the mouthpiece includes a fluid diffuser array in fluid communication with the inlet passageway. According to another aspect, the fluid diffuser array includes a first diffuser having primary diffuser holes and a second diffuser having secondary diffuser holes having an overall diameter that is smaller than the primary diffuser holes.

According to an aspect, the device further comprises an inlet conduit extending through the inlet passageway and beyond a surface of the posterior facing end. According to another aspect, the inlet conduit includes a plurality of spaced apart holes about its proximal end for delivering therapeutic fluid to a plurality of areas in the oral cavity. According to another aspect, the inlet conduit includes a plurality of holes for delivering the therapeutic fluid to a plurality of areas in the oral cavity. According to another aspect, the inlet conduit includes a plurality of secondary conduits extending from a proximal end thereof for delivering therapeutic fluid to a plurality of areas in the oral cavity.

According to an aspect, the device further comprises a reservoir extending from the mouthpiece and in fluid communication with the outlet passageway for permitting therapeutic fluid to flow from the oral cavity to the reservoir and from the reservoir to the oral cavity under the influence of gravity. According to another aspect, the reservoir includes an outlet for discharging therapeutic fluid received from the oral cavity. According to another aspect, the reservoir extends from the mouthpiece in a direction above a user's cheek. According to another aspect, the reservoir includes an inlet for receiving a fluid.

According to an aspect, the device further comprises a biosensor carried by at least one of the mouthpiece and the reservoir. According to another aspect, the biosensor is selected from the group consisting of a mineral sensor, a chemical sensor, a pH sensor, a temperature sensor, a metabolite sensor, a biomarker sensor, a vitamin sensor, a metabolic sensor, a stress hormone sensor, an inflammatory marker sensor, an oxidation level sensor, a heavy metal sensor, a microbe sensor, a virus sensor, a gas concentration sensor, a saliva sensor, a blood sensor, and an inflammatory fluid sensor.

According to an aspect, the source of pressurized fluid comprises a container for housing the therapeutic fluid, and a pump operatively in communication with the container for pressurizing the therapeutic fluid. According to another aspect, the device further comprises a container having a lid that includes a catalyst or activated carbon, and wherein the mouthpiece further comprises an outlet conduit extending from the outlet passageway and in communication with the container. According to another aspect, the therapeutic fluid is selected from the group consisting of ozone, nitric oxide gas, mouthwash, water mixed with hydrogen peroxide, water mixed with ozone, and combinations thereof.

In accordance with another exemplary embodiment there is provided a device for delivering a therapeutic fluid to an oral cavity of a user comprising a source of pressurized therapeutic fluid and a mouthpiece. The mouthpiece includes a flexible membrane having a lip engaging surface surrounding the flexible membrane for sealing the oral cavity from an external environment when the lip engaging surface is engaged by a user's lips, and a manually adjustable inlet for delivering the therapeutic fluid to the oral cavity of the user when the oral cavity is sealed from the external environment by a user's lips in engagement with the lip engaging surface. The mouthpiece further includes an outlet for enabling egress of the therapeutic fluid from the oral cavity when the oral cavity is sealed from the external environment by a user's lips in engagement with the lip engaging surface.

According to an aspect, the device further comprises an outlet conduit extending from the outlet for receiving therapeutic fluid from the oral cavity. According to another aspect, the flexible membrane extends anteriorly of the lip engaging surface. According to another aspect, the flexible membrane is coextensive with the lip engaging surface.

In accordance with another exemplary embodiment there is provided a method for delivering a therapeutic substance to an oral cavity of a user. The method comprises fitting a mouthpiece to a mouth of a user to seal the oral cavity of the user, delivering a therapeutic fluid under pressure to the mouthpiece via a first conduit coupled to the mouthpiece such that the fluid enters the oral cavity of the user, and draining the therapeutic fluid under pressure from the oral cavity via a second conduit coupled to the mouthpiece.

According to an aspect, the method further comprises mixing saliva drained from the oral cavity with therapeutic fluid and delivering the admixture to the oral cavity through the second conduit. According to another aspect, the method further comprises providing a reservoir coupled to the mouthpiece and having an outlet disposed above the mouthpiece.

Other features and advantages of the subject disclosure will be apparent from the following more detailed description of the exemplary embodiments.

BRIEF DESCRIPTION OF THE DRAWINGS

The accompanying drawings, which are incorporated in and constitute a part of this specification, exemplify embodiments of the present invention and, together with the description, serve to explain and illustrate principles of the invention and not to limit the claimed invention thereto. The drawings are intended to illustrate major features of the exemplary embodiments in a diagrammatic manner. The drawings are not intended to depict every feature of actual embodiments nor relative dimensions of the depicted elements, and are not drawn to scale. Note also that reference symbols or names are used in the Figures to indicate certain aspects or features shown therein, with reference symbols common to more than one Figure indicating like components, aspects or features shown therein.

The features, advantages, and benefits of the present invention will become more apparent from the following description taken in conjunction with the accompanying drawings, which are presented solely for exemplary purposes and not with the intent to limit the invention thereto, and in which.

DETAILED DESCRIPTION

Figure 1:
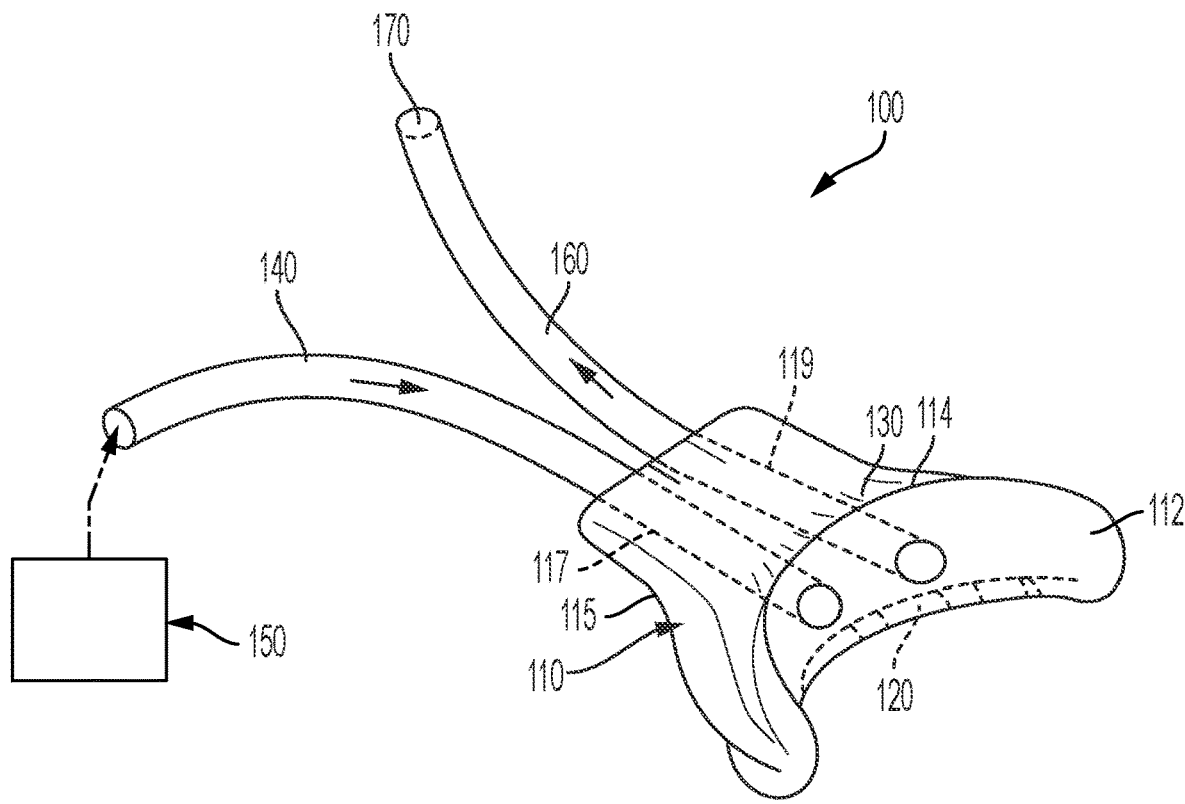
FIG. 1 is a posterior perspective view of a first exemplary embodiment of a device in accordance with the subject disclosure for delivering a therapeutic fluid to an oral cavity of a user.

Reference will now be made in detail to the various exemplary embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

"About" as used herein when referring to a measurable value such as an amount, a temporal duration, and the like, is meant to encompass variations of ±20%, ±10%, ±5%, ±1%, or ±0.1% from the specified value, as such variations are appropriate.

"Substantially" as used herein shall mean considerable in extent, largely but not wholly that which is specified, or an appropriate variation therefrom as is acceptable within the field of art. "Exemplary" as used herein shall mean serving as an example.

Throughout the subject application, various aspects thereof can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure may be combined in any suitable manner in one or more embodiments. One skilled in the relevant art will recognize, in light of the description herein, that the subject disclosure can be practiced without one or more of the specific features or advantages of a particular exemplary embodiment. In other instances, additional features and advantages may be recognized in certain embodiments that may not be present in all exemplary embodiments of the present disclosure.

As shown in FIG. 1, according to an exemplary embodiment of the present invention, a device 100 for delivering a therapeutic fluid to an oral cavity of a user comprises a source of pressurized therapeutic fluid 150 and a mouthpiece 110. Examples of sources of pressurized fluid are discussed in greater detail hereinafter. The mouthpiece has a posterior facing end 112 for aligning with a front of a user's oral cavity, and a body 115 extending from the posterior facing end, the body having a lip engaging surface 120, 130 for sealing the oral cavity from an external environment when the lip engaging surface is engaged by a user's lips. The mouthpiece further includes an inlet passageway 117 coupled to the source of pressurized fluid, the inlet passageway extending through the body and in fluid communication with the posterior facing end for delivering the pressurized therapeutic fluid to the oral cavity when the oral cavity is sealed from the external environment by a user's lips in engagement with the lip engaging surface. Additionally, the mouthpiece includes an outlet passageway 119 extending through the body and in fluid communication with the posterior facing end for enabling egress of the therapeutic fluid from the oral cavity when the oral cavity is sealed from the external environment by a user's lips in engagement with the lip engaging surface. A first conduit (inlet conduit) 140 directs pressurized fluid from the source of pressurized therapeutic fluid 150 to the mouthpiece 110 which is designed to allow the lower and upper lips of a user to encircle and seal the mouthpiece 110 at a lower lip engaging surface 120 and an upper lip engaging surface 130. The mouthpiece 110 is designed with an inner flange 114 which is shaped to curve along the surface of the inside of the lips and around the mouth of the user to enable a sealing surface to be formed against the lower 120 and upper 130 lip engaging surfaces such that when the user closes the lips and encircles and presses down upon the mouthpiece 110, the oral cavity is sealed by mouthpiece 110 and held firmly in place. The inner flange 114 is slightly curved and circles the lips so as to fit the generally convex contours of the face and lips of the user and the body 115 tapers in an anterior direction. The lower lip engaging surface 120 and upper lip engaging surface 130 each include a recess for receiving a user's lips to provide a fluid seal when the user's lips are received in the recess to facilitate a pressure seal in the oral cavity. A pressure seal is maintained by means of the lips encircling and pressing against the mouthpiece 110 and the inner flange 114. As mentioned, device 100 directs pressurized fluids into the oral cavity. Such fluids may be composed of liquids and gases of all kinds including water, water mixed with hydrogen peroxide, mouthwashes, oxygen, ozone, and/or any other therapeutic liquids or mix of liquids and other substances for some beneficial effect. Similarly, such fluids may be composed of gases such as air, oxygen, ozone, nitric oxide gas, and/or other therapeutic gases. Such fluids may be used separately, or combined with one another, or used one after the other as directed. Such pressurized fluids preferably have sufficient pressure to enter and permeate the entire oral cavity for such anticipated therapeutic effect and thereafter be able to exit the oral cavity via a second conduit (outlet conduit) 160 which disposes of the fluid output at the output end 170 of outlet conduit in a safe manner, as described below.

The inlet conduit 140 and outlet conduit 160 can be of any suitable size and shape, and be placed anywhere on the mouthpiece as long as their respective functions remain intact. Preferably, the outlet conduit 160 can be slightly larger in size, e.g., have a larger diameter, than inlet conduit 140 to accommodate other fluids or substances inside the mouth, which may increase in volume of the fluid output at 170, which the pressurized fluid may rinse away. Preferably, the user would use the present invention in such a manner as to retain enough fluid in the oral cavity to saturate the whole oral cavity. To that end, a user would preferably tilt the head back to form a "bowl" in the oral cavity, fill the whole mouth with enough fluid, and elevate the outflow and point of eventual disposal.

In contrast to current ozone therapies in the dental field, the present invention uses positive pressure to remove any pressurized fluids from the oral cavity (whether the fluid is ozonated water or ozone gas, nitric oxide gas, etc.). The present invention is designed to ozonate the whole mouth and not just a particular tooth or specific spot in the mouth as currently being used in prior art devices. The present invention disperses its oxidative therapy, whether ozone or hydrogen peroxide, or other substance, everywhere inside the oral cavity. Moreover, the fluid in the oral cavity in one preferred embodiment creates a foamy oxidative antimicrobial mixture ("FOAM") which bathes and circulates all over the inside the oral cavity—everywhere in the mouth and not, as in current prior art technologies, a particular tooth, a row of teeth, or a certain area around or down into a given gum pocket, nerve root canal, spot on a gum, etc. Also, the present invention preferably enables the fluid to mix with the user's saliva to enhance any oxidative therapy. Unlike some prior art dental therapies which use ozonated water to irrigate a particular spot, the present invention favors the use of swishing and rinsing the oral cavity with saliva-rich FOAM, as well as, according to some embodiments of the present invention, using pressurized ozone gas to permeate the mouth everywhere.

In contrast to current dental ozone technologies, the present invention may be used in such a way to provide a constant stream of pressurized ozone gas or ozonated water for an extended period of time and diffuse, mix, and recirculate with saliva or other therapeutic agents simultaneously.

Figure 1A:
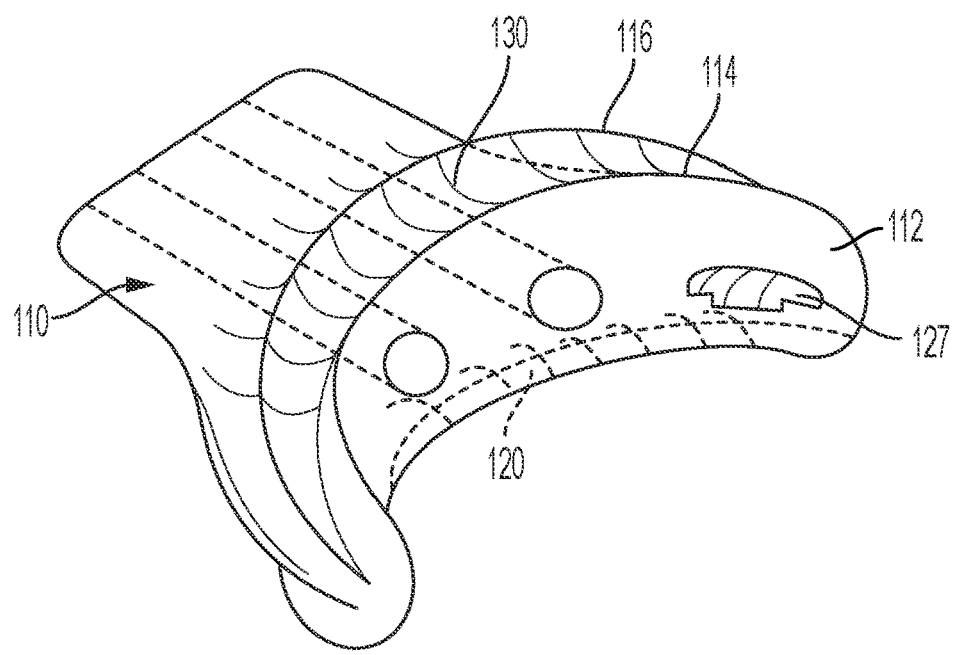
FIG. 1A is a posterior perspective view of a mouthpiece for use with a device in accordance with the subject disclosure.

FIG. 1A shows an alternative exemplary embodiment of the mouthpiece 110 showing a partial perspective view wherein the mouthpiece is fitted with an outer flange 116 that is shaped to curve along the surface of the frontal facial part of the lips and an inner flange 114 which is shaped to curve along the surface of the inside of the lips of the user and a recess between these two flanges forming lower lip 120 and upper lip 130 engaging surfaces so that when the user presses the lips against the engaging surfaces and presses against the mouthpiece 110 and all the way around the mouthpiece 110, the user can hold the mouthpiece 110 firmly in place and seal the oral cavity. In other words, each lip engaging surface includes a recess for receiving a user's lip (upper or lower) to provide a fluid seal when the user's lip is received in the recess. The inner flange 114 and outer flange 116 are slightly curved and circle the lips so as to fit the generally convex contours of the face and lips of the user. The lower lip engaging surface 120 and upper lip engaging surface 130 facilitate a pressure seal in the oral cavity. A pressure seal is maintained by means of the lips encircling and pressing against the mouthpiece 110 and the sealing surfaces 120 and 130 of the inner 114 and outer 116 flanges. Ridge areas can also be formed on the inner surface of mouthpiece 110, as shown at 127, for example, on one side of the mouthpiece 110. The other ridge area on the opposite inner surface of mouthpiece 110 is obscured by the outer lip sealing surface. These ridge areas provide the mouthpiece with a bite plate extending from the posterior facing end 112 and can be used by a user to enable more secure retention of the mouthpiece in the user's mouth, since the user's teeth can clamp down on these ridge area surfaces.

Figure 1B:
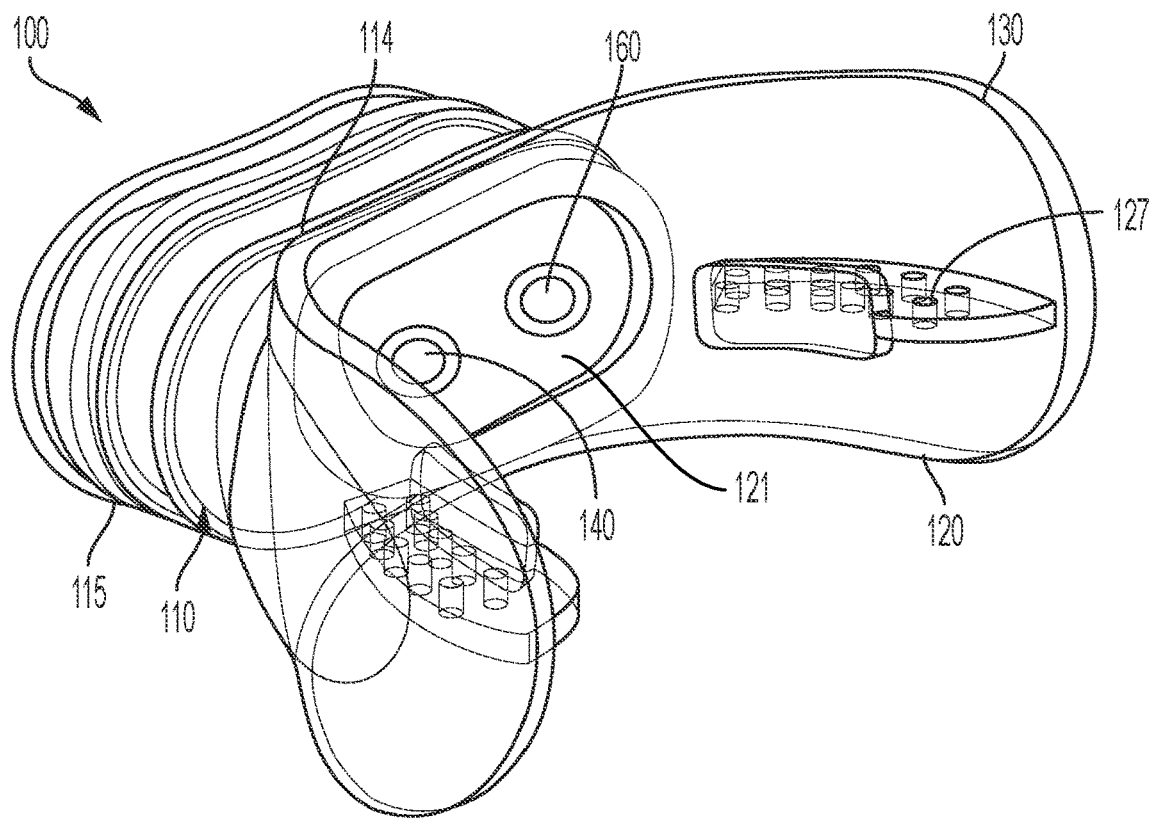
FIG. 1B is a posterior perspective view of an exemplary embodiment of another mouthpiece for use with a device in accordance with the subject disclosure.
Figure 1C:
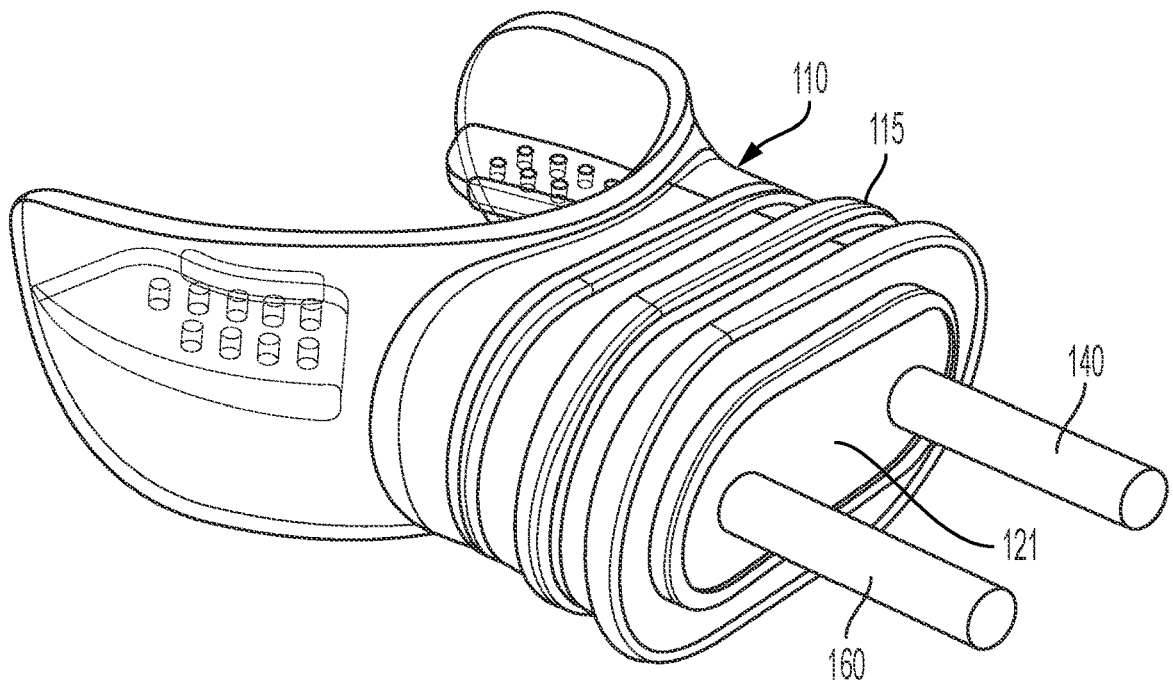
FIG. 1C is an anterior perspective view of the mouthpiece of FIG. 1B.

FIGS. 1B and 1C illustrate an exemplary embodiment of the mouthpiece 100 wherein pressurized fluid enters the oral cavity (not shown) by means of a single inlet conduit 140 connected to a mouthpiece and exits through a single outlet conduit 160 in order to dispose of such fluid. FIGS. 1B and 1C further illustrate an alternative lip sealing surface compared to FIG. 1. Further, the body 115 shown in these figures is a hollow body having an insert plug 121 removably received in the hollow body, and the inlet passageway and the outlet passageway are provided in the insert plug and receive the inlet conduit and outlet conduit, respectively. FIG. 1B additionally illustrates that the mouthpiece further comprises a bite plate 127 extending from the posterior facing end of the mouthpiece.

Figure 1D:
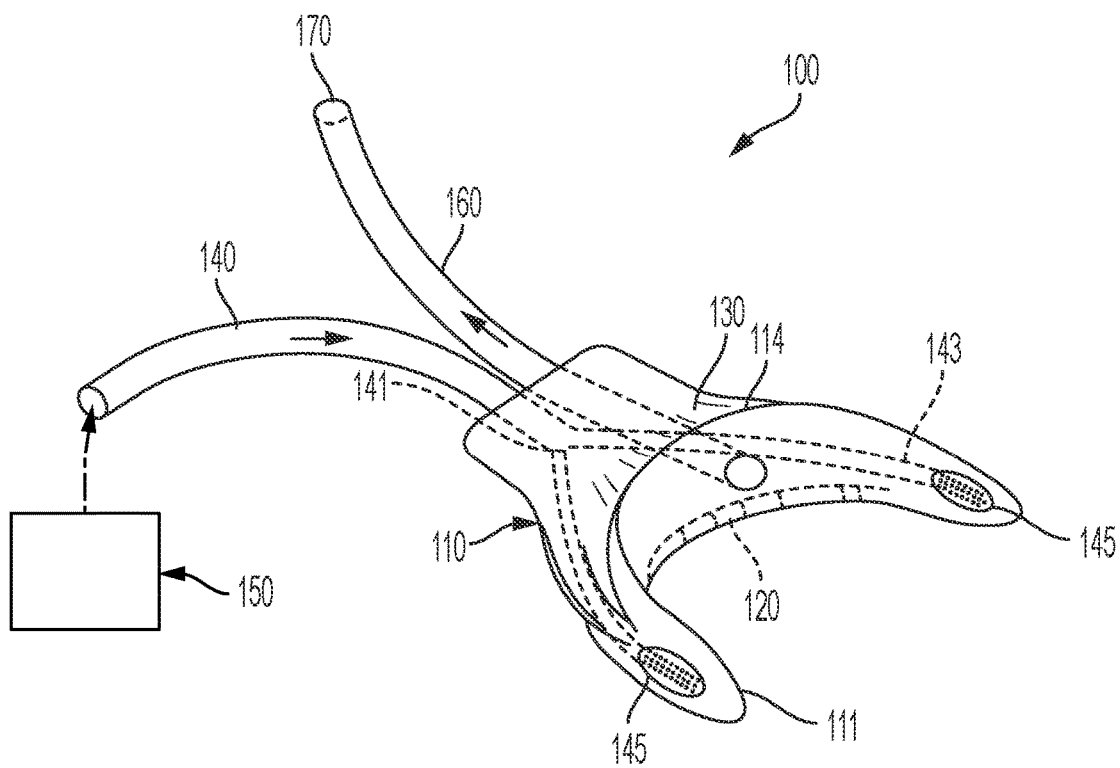
FIG. 1D is a posterior perspective view of an exemplary embodiment of another mouthpiece for use with a device in accordance with the subject disclosure.
Figure 1E:
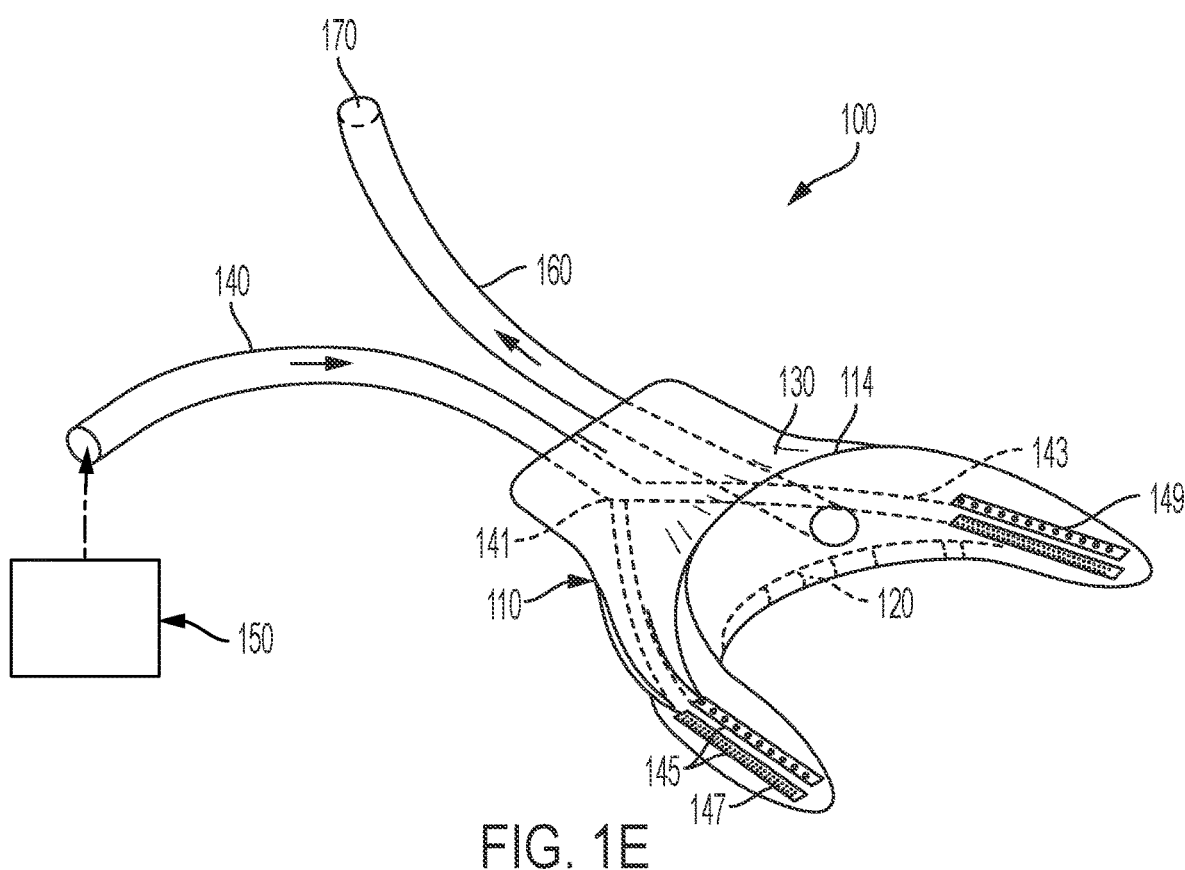
FIG. 1E is a view similar to FIG. 1D showing an exemplary embodiment of fluid diffuser arrays suitable for use with a mouthpiece according to the subject disclosure.

FIG. 1D illustrates the device 100 according to another exemplary embodiment of the subject disclosure wherein pressurized fluid enters the oral cavity (not shown) by means of a single inlet connected to a mouthpiece 110 with such single inlet splitting 141 inside the mouthpiece into two inlet passageways 143 which each direct the pressurized fluids to and out of diffuser arrays 145 depicted on each side of the mouthpiece which extends at 111 into the oral cavity towards the molars in the buccal area. The mouthpiece thus includes at least one fluid diffuser array in communication with the inlet passageway. In the illustrated embodiment, the mouthpiece includes a plurality of holes each in fluid communication with the inlet passageway for enabling the therapeutic fluid to be directed to a plurality of areas in the oral cavity. That is, each diffuser array 145 has small microbubble-producing diffuser holes 147. The pressurized fluid exits through a single outlet and disposes of such fluid in a safe and controlled manner. Preferably, if the pressurized fluid is pressurized gas, the diffuser array 145 would have a plurality of very small holes 147 (e.g., about 20-30 microns) for producing microbubbles. Pressurized gases which are forced through small holes will create small bubbles and therefore there will be greater absorption of the gas into the tissues and other liquids present in the oral cavity. For pressurized liquids, the diffuser array 145 would have a plurality of larger holes 149 (such as depicted in FIG. 1E) as necessary to accommodate such pressurized liquid fluids. Preferably, the inlet passageway split 141 and two passageways 143 can be molded into the mouthpiece 110 and extend as necessary all the way through the mouthpiece extensions 111 into the oral cavity. Preferably, the diffuser array 145 should be fitted into the mouthpiece 110 so that it is aiming at the teeth and gums and away from the cheeks.

Having diffuser arrays pointed towards the teeth and gums enables pressurized fluids to jet the fluids towards the teeth and gums and direct microbubbles at such tissues, at levels either between the upper and lower rows of teeth, or at the level of the gum line of either, or both, upper and/or lower rows of teeth. Forcing pressurized fluid and FOAM at and in between the teeth and gums eliminates biofilm and pathogenic bacteria which hide in inflamed periodontal pockets, crevicular fluids, and structures supporting implants, etc. An additional embodiment (not shown) could be designed such that a diffuser array 145 is in the form of a ridge as depicted in FIG. 1A above (depicting a place for teeth to clamp down upon), although it would be preferable, if such a design as this were used, to have the ridge elongated so that it would extend along as many teeth as possible. Such a configuration would have the pressurized fluid going up and down towards at the enamel top of each tooth along a row of teeth, as well as any spaces between them. Such a design would not interfere with any swishing the user may try to do.

Another benefit of the present invention is that if the inlets, diffuser arrays, and outlets are properly sized, a relatively high flow rate of oxidative pressurized fluids can be streamed through the oral cavity to clean the teeth, gums, and the interdental spaces between the teeth. Custom molded mouthpieces 110, or a wide assortment of various sized mouthpieces 110 capable of extending 111 to the back of the rows of teeth to the buccal area will facilitate a thorough oxidative therapeutic treatment.

Another benefit of having diffuser arrays 145 fitted into the mouthpiece 110 is that the user can swish the pressurized fluid and any FOAM back and forth between the teeth without having anything blocking the flow of fluid or FOAM as it moves back and forth between the teeth. A dental mouth tray such as a molded device which fits over a row of upper or lower teeth and gums (for example, the Medozon Mouth Tray or other trays with a hyperbaric design), would block such swishing back and forth of the fluid and FOAM between the teeth and over the gums. Swishing the fluid or FOAM between the teeth results in a remarkable oxidative therapy due to both the mechanical and therapeutic properties of the fluid and/or FOAM, especially the action of the microbubbles which provide a thorough "scrubbing" action to clean the teeth and gums.

FIG. 1E illustrates the present invention according to one embodiment wherein pressurized fluid enters the oral cavity (not shown) by means of a single inlet connected to a mouthpiece 110 with such single inlet splitting 141 inside the mouthpiece into two passageways 143 which each direct the pressurized fluids to a double-row of diffuser arrays 145. As noted above, different embodiments of the present invention can have multiple diffuser arrays 145 arranged in rows at different levels. It is possible in some embodiments that the portion of the mouthpiece 110 that extends at 111 back towards the molars is full of diffuser arrays, or even becomes one large diffuser array itself. Such diffuser arrays 145, depending upon the size and shape of the mouthpiece 110, may extend at 111 all the way from the front teeth to the back molars (not shown) in effect creating a "vertical" mouth tray extending to the buccal area of the oral cavity and jettisoning pressurized fluids towards all the teeth along the diffuser array. As noted, the diffuser arrays 145 can have different holes for different pressurized fluids, such as smaller holes 147 for pressurized gases and larger holes 149 for pressurized liquids. In other words, the diffuser array 145 can include a first diffuser having primary diffuser holes and a second diffuser having secondary diffuser holes having an overall diameter that is smaller than the primary diffuser holes. Diffusing gases out of small holes from a lower diffuser array 145 and diffusing liquids out of larger holes from an upper diffuser array 145, as shown in FIG. 1E, would create a substantial amount of FOAM, depending upon the gases and liquids selected. Additionally, different pressurized fluids can be combined by increasing the number of inlet conduits.

Figure 2:
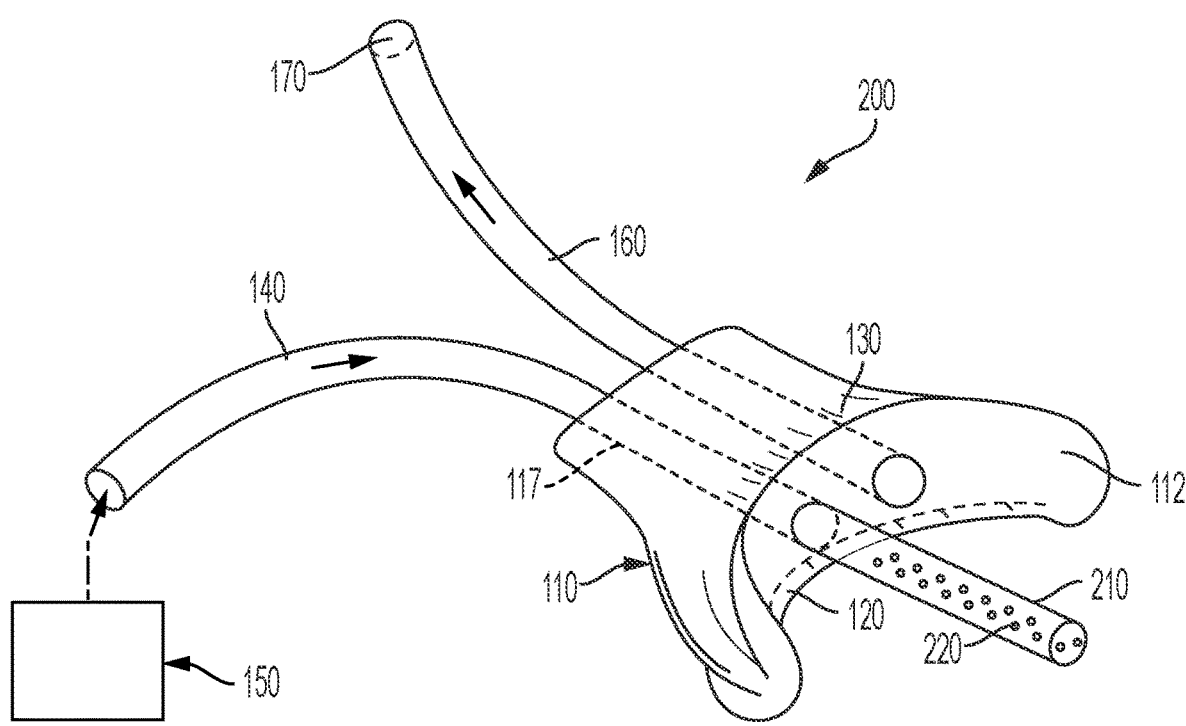
FIG. 2 is a posterior perspective view of an exemplary embodiment of another mouthpiece for use with a device in accordance with the subject disclosure.

FIG. 2 shows an alternative exemplary embodiment of a device 200 according to the subject disclosure for delivering a therapeutic fluid to an oral cavity of a user comprising a source of pressurized therapeutic fluid 150 and a mouthpiece 110. According to this embodiment, a fluid input conduit 140 extends through the inlet passageway 117 and beyond a surface of the posterior facing end 112 a selected distance into the user's oral cavity, as seen at 210. The extension allows the pressurized fluid to be dispersed more evenly in the oral cavity by means of a plurality of small diffuser holes 220 in the extended fluid conduit 140. In other words, the extension 210 of the inlet conduit includes a plurality of holes for delivering therapeutic fluid to a plurality of areas in the oral cavity. According to an aspect, the plurality of holes are a plurality of spaced apart holes about a proximal end of the inlet conduit. The extension conduit 210 is preferably long enough to reach the back of the oral cavity, however, not so long as to generate a "gag" reflex by the user. Extension 210 should also be flexible and comfortable enough to allow the user to move it all around the inside the mouth. In an alternate embodiment, conduit 210 could be a third conduit separately attached to the side of the mouthpiece 110 that is inside the user's oral cavity, such that fluid is enabled to flow first through the fluid input conduit, then the body of the mouthpiece and then through the conduit 210 and into the mouth.

Depending upon the fluid in use, the small holes 220 will vary in size. For example, pressurized liquids may require larger holes than pressurized gases, as explained above in in connection with FIGS. 1D and 1E. Pressurized gases which are forced through smaller holes will create smaller bubbles and therefore greater absorption into the tissues and other liquids present in the oral cavity. A typical size of a diffuser hole may be about 20 or 30 microns, but smaller and larger holes will also suffice.

Combining fluids can have certain therapeutic effects. For example, if pressurized ozone gas is diffused into the oral cavity and mixed with any saliva, liquid, or foamy mixture in the mouth (for example, any residual mixture of water and toothpaste after brushing), the combination will create a foamy oxidative anti-microbial mixture (FOAM, as described above) which saturates and cleans the teeth, gums, tongue, spaces between the gums and the inside of the cheeks, the floor of the mouth, etc. Additional therapeutic benefits can result from swishing the FOAM and pressurized gas around the oral cavity and in between the teeth, almost like a "FOAM floss" which can reach down into the gum tissues, periodontal pockets, and interact with crevicular fluids for a deep tissue oxidative therapy. The effects are particularly beneficial if the user makes a point of retaining saliva, as well as toothpaste, in the oral cavity before using the present invention. Natural organic toothpaste and filtered water are preferable.

Figure 3:
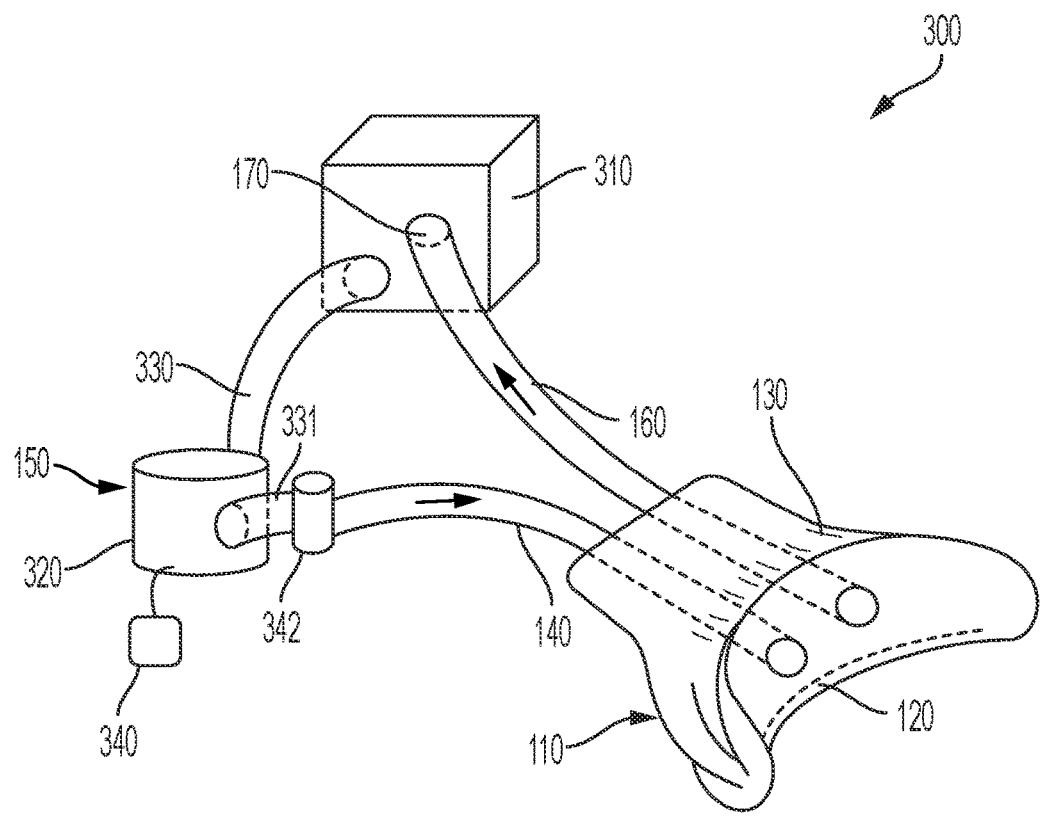
FIG. 3 is a partially schematic view of a device in accordance with the subject disclosure including a container connected to an outlet of a mouthpiece for collecting fluid drained from an oral cavity of a user, which container is connected to a fluid pump that supplies pressurized fluids to the oral cavity in a continuous recirculating loop.

FIG. 3 shows an alternative embodiment of a device 300 according to the subject disclosure illustrating use a fluid container 310 and a fluid pump 320 as a source of pressurized fluid 150 to enable the fluid to be recirculated in the oral cavity. In other words, the container houses the therapeutic fluid, and the pump is operatively in communication with the container for pressurizing the therapeutic fluid. After initially filling the container 310 with fluid, the fluid pump 320 is connected to the fluid container by means of a conduit 330 and directs pressurized fluid through a filter 342 via conduit 331 and into the oral cavity by means of the inlet conduit 140. Such fluid exits the oral cavity by means of outlet 160 whereupon the output fluid exiting at end 170 is collected in the container 310 which is connected to the fluid pump 320 to direct the fluid back to the oral cavity in a continuous recirculating loop. To control the flow, quantity, and pressure of the fluid directed to the oral cavity, the fluid pump 320 output can be manually controlled by a suitable controller 340. Adding the filter 342 to catch food particles and prevent them from recirculating may be advisable, unless the user first cleanses the mouth and teeth with a "first pass" washing during which food particles and any debris or unwanted substances are sent to waste before connecting the outlet conduit 160 to the container 310. Alternatively, a manually compressible squeeze bottle for delivering fluid under pressure (similar to the element identified by reference numeral 820 in FIG. 8, discussed below) could be used in lieu of a fluid pump and container as the source of pressurized fluid 150.

Figure 4:
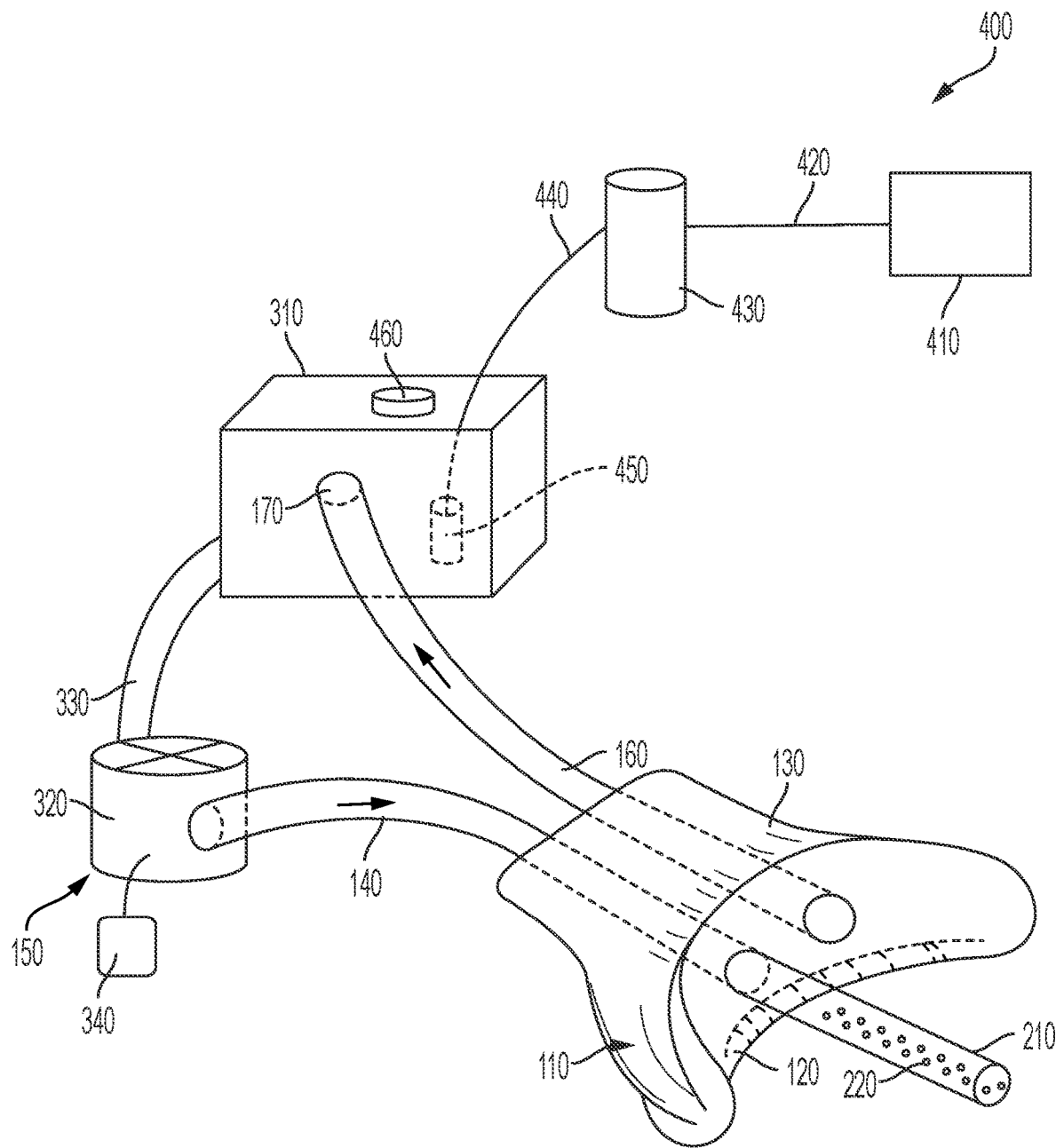
FIG. 4 is a partially schematic view of another device in accordance with the subject disclosure similar to FIG. 3 and further including an ozone generator for diffusing ozone gas into the container whereupon ozonated fluids are pumped into the oral cavity in a continuous recirculating loop.
Figure 9:
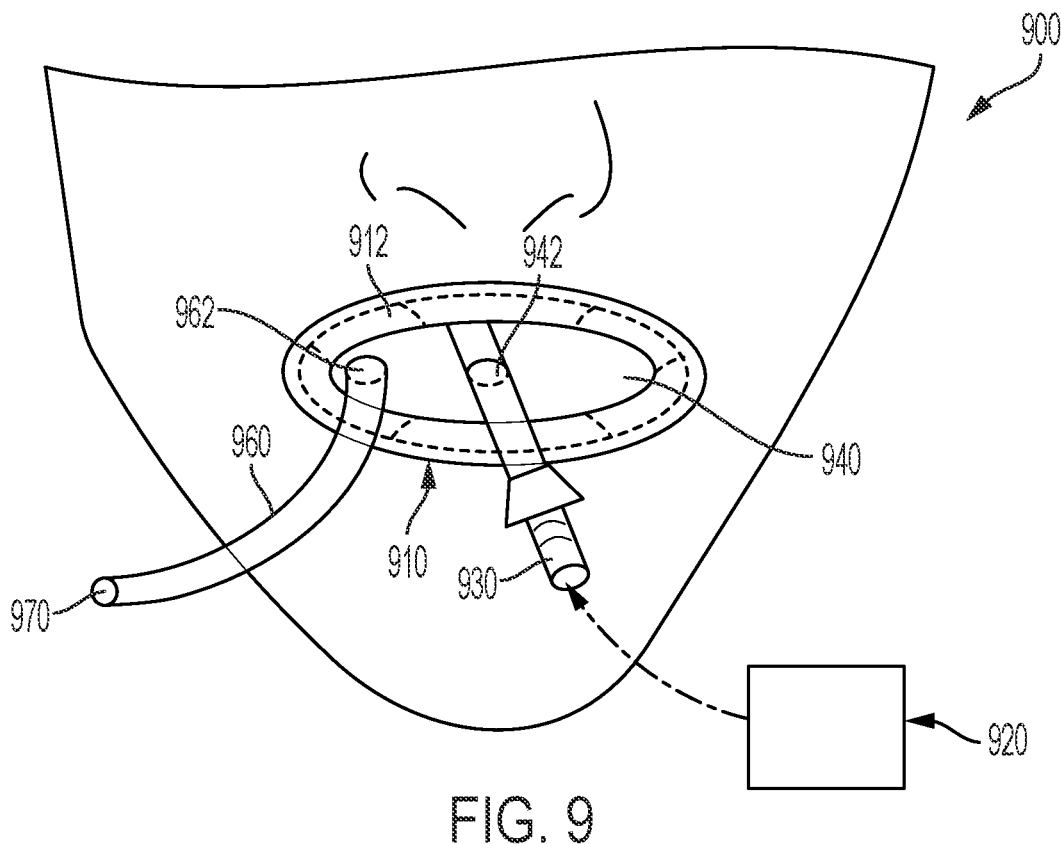
FIG. 9 is a partial front view of a user's face showing an exemplary embodiment of another device in accordance with the subject disclosure used with a conventional water flossing machine.

FIG. 4 shows an alternative embodiment of a device 400 according to the subject disclosure illustrating the use of ozonated water as the pressurized therapeutic fluid. A source of feed gas 410 (which may be pressurized ambient air, dried and concentrated oxygenated air, medical grade oxygen, or the like) is directed through a pressurized feed gas conduit 420 to an ozone generator 430 and through a conduit 440 of pressurized ozone gas and released through an ozone diffuser 450 positioned in the fluid container 310. Fluid container 310 is preferably also fitted with an ozone gas destruct lid and outlet 460. The concentration of ozone depends upon many factors which the user can control, such as the rating of the ozone generator, controls on the ozone generator unit, and the source of feed gas. The pressurized ozonated water in the container 310 is connected to the fluid pump 320, which together comprise a source of pressurized therapeutic fluid. The pump 320 directs the fluid into the oral cavity via the fluid input conduit 140. As indicated in the exemplary embodiment shown in FIG. 2, a proximal end of the input conduit 140 preferably extends at 210 into the oral cavity wherein the ozonated fluid is released through small holes 220 to more evenly disperse the ozonated water in the oral cavity. The ozonated water exits out the output conduit 160 to the container 310 in a recirculating loop. According to an alternative exemplary embodiment, if the user does not wish to recirculate the fluid, the user may elect to direct the fluid output at end 170 to waste down a drain (see FIG. 13). The components of embodiment 400 could also form the basic components (fluid container, fluid pump, inlet, and outlet) for a conventional or portable water flosser as depicted in FIG. 9 and related embodiments.

As depicted in FIG. 4, the ozone generator 430 can be of any design, either a corona discharge ("CD") or ultraviolet ("UV") type, or related technology. It may also feature a combination of ozone and UV radiation technologies which produce advanced oxidation products (AOPs) for even greater oxidative therapy than ozone alone as exemplified in U.S. Pat. No. 11,046,602, which is incorporated by reference in its entirety.

FIGS. 2 and 4 depict one inlet 210 designed to extend into the oral cavity. The inlet 210 should preferably be made of a soft, flexible bio-compatible-grade material, such as silicone or the like, and be shaped as a small tube or band, or any other suitable comfortable shape, which allows the user to direct the inlet 210 to all areas of the oral cavity to clean all the tissues therein, as well as any implants, braces, dentures, crowns, etc. A thorough cleaning of all tissues and man-made structures in the mouth is important to prevent disease. For example, the American Academy of Periodontology warns of an oral disease called peri-implant mucositis, claiming that it is a very serious condition. Inflammation of the soft tissues surrounding a dental implant, bone loss, remodeling, etc. are all topics of increasing concern. Traditional oral homecare, even by the most conscientious, is not enough to destroy harmful largely anaerobic germs that "hide out" under the gums. As noted, conventional cleaning actions can disrupt the biofilm and release all kinds of bacteria and toxins into the bloodstream. However, using the devices according to the subject disclosure can kill such microbes, including those which are dislodged during probes of the periodontal pockets, scaling and deep cleaning.

By moving the inlet extension 210 around in the oral cavity and positioning the tongue, the user can direct where the fluids go and if necessary, prevent them from going to certain areas inside the oral cavity. For example, if ozone gas or ozonated water fluids are used, it may be desirable to place the inlet or multiple inlets, as described below, in such a manner as to prevent any FOAM and/or fluid from saturating the dorsal area of the tongue where many researchers believe so-called good bacteria forming part of the nitrate/nitrite/nitric oxide ("NO") cycle reside. As a practical matter, normally, the tongue rests towards the back of the throat during operation of the present invention, presumably as part of the normal gag reflex. It requires a conscious decision by the user to extend the tongue forward and backwards to saturate the back dorsal area of the tongue with fluids or FOAM. Users of devices according to the subject disclosure who contemplate using it for an extended period of time can cultivate the bacteria species known to activate the nitrate/nitrite/NO cycle before using the present invention and, over time, compare the before and after levels of such bacteria species. Technologies exist to check the type of bacteria in the oral cavity as well as NO levels.

Figure 5:
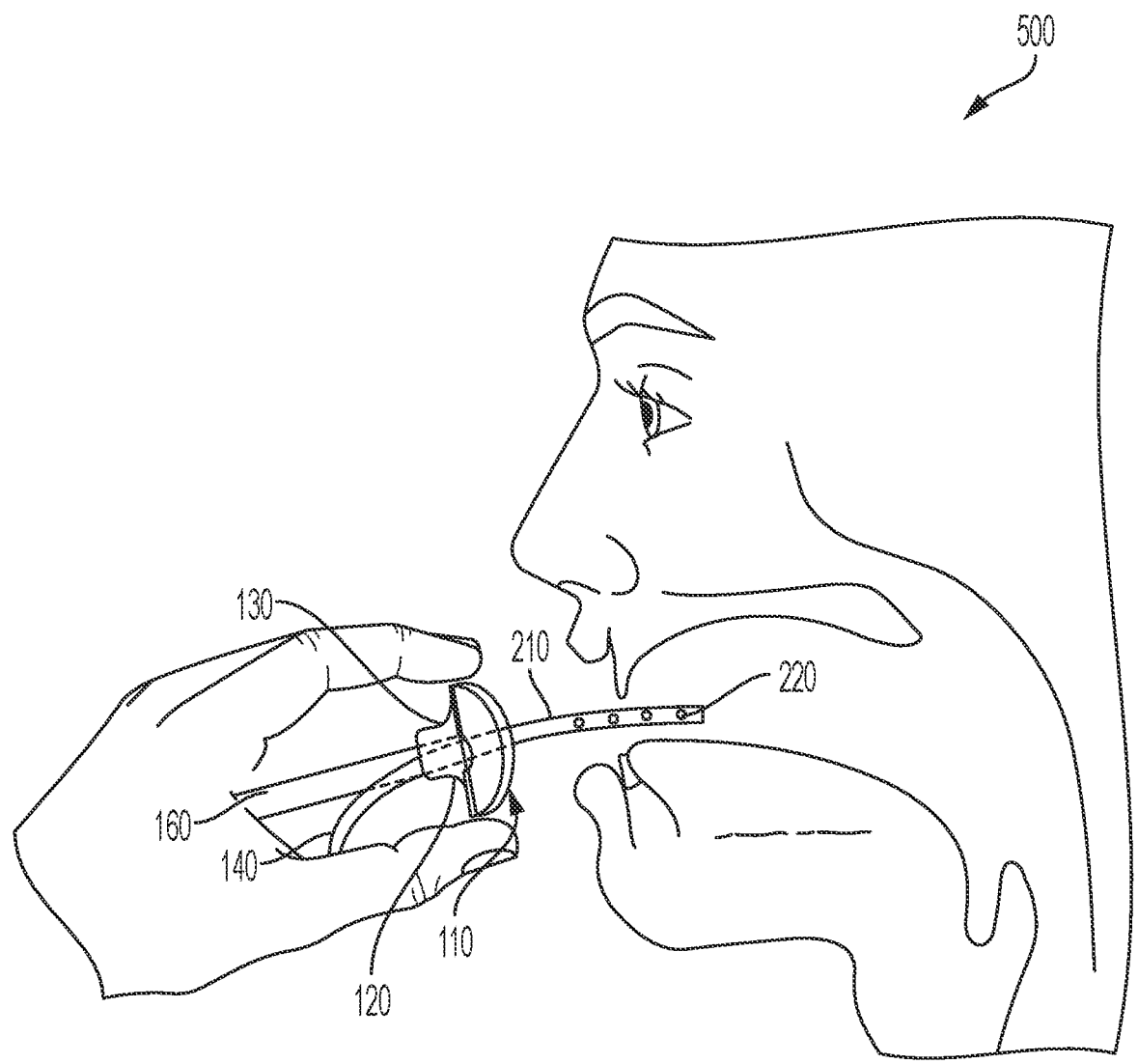
FIG. 5 is a side view showing a user holding a mouthpiece of a device according to the subject disclosure prior to inserting the mouthpiece into the user's oral cavity (shown partially cut away)

FIG. 5 illustrates a side view of an exemplary embodiment of a device 500 according to the subject disclosure showing a user in in partial cut-away view holding the mouthpiece 110 of the device and getting ready to insert it into the oral cavity. Device 500 shows a single inlet 210 designed to extend into the oral cavity and having a plurality of holes 220 to diffuse the fluid more evenly into the oral cavity.

Figure 6:
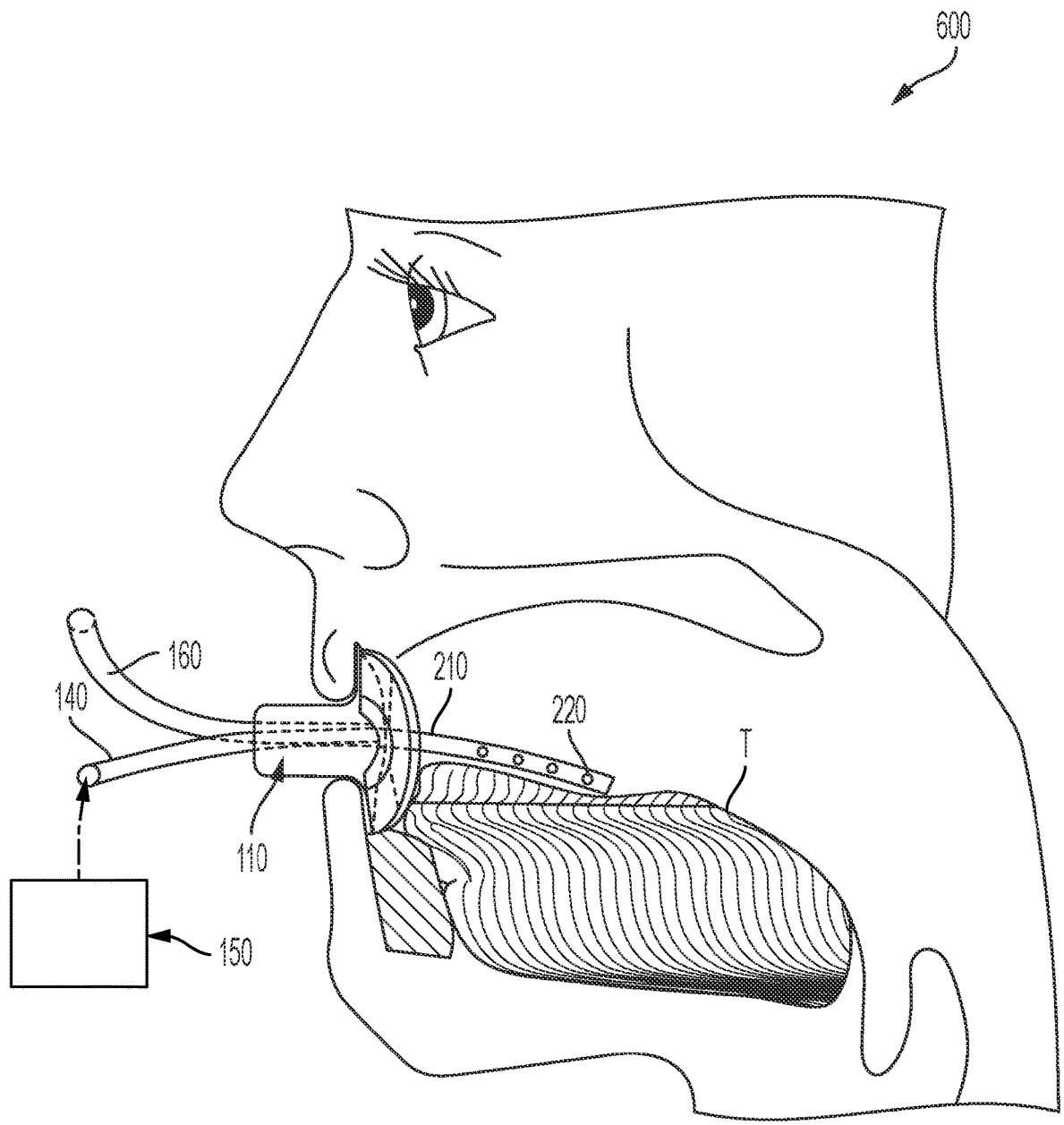
FIG. 6 is a side view of the mouthpiece of FIG. 5 inserted into the user's oral cavity (shown partially cut away) with the mouthpiece being sealed by the lips of the user.

FIG. 6 shows an exemplary embodiment of a device 600 according to the subject disclosure comprising a mouthpiece and a source of pressurized therapeutic fluid 150. As illustrated, the mouthpiece 110 and the inlet conduit extension 210 are positioned inside the user's mouth and sealed by the user's lips and also shows the inlet conduit extension 210 extending into the oral cavity and resting just above the user's tongue "T". While a user can seal the mouthpiece 110 just by closing both upper and lower lips against upper and lower lip engaging surfaces of the mouthpiece as illustrated, the user can also hold device 600 in place by biting gently on the input conduit 210 if necessary. The input conduit 210 may be reinforced to accommodate any wear and tear as a result of biting on it.

Figure 7:
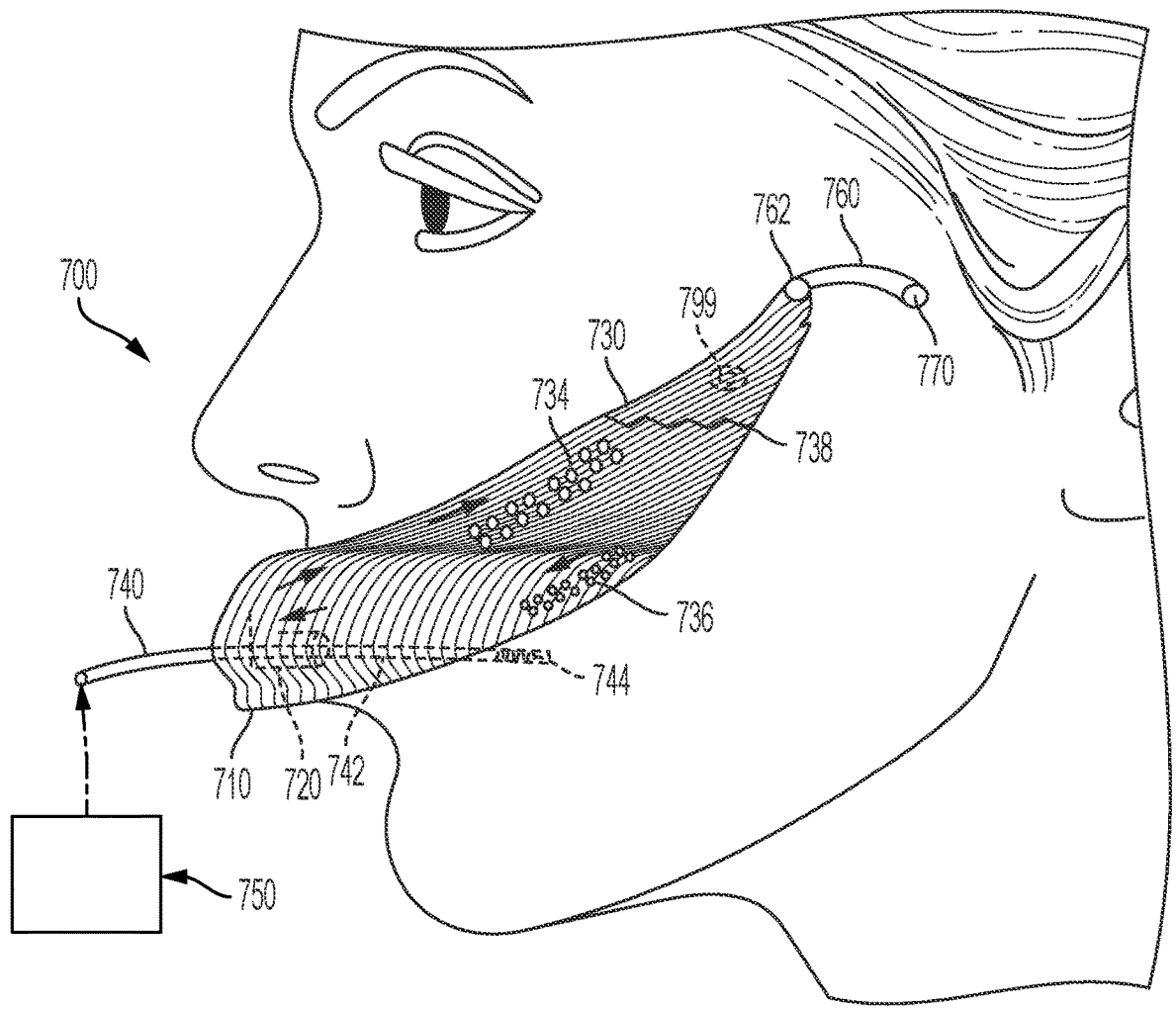
FIG. 7 is a side view of an exemplary embodiment of another device in accordance with the subject disclosure including an external reservoir attached to the mouthpiece, which reservoir provides space for a foamy oxidative antimicrobial mixture (FOAM) generated in the oral cavity and exiting the oral cavity through a passageway formed in the mouthpiece to coalesce, liquefy, and return by gravity back into the oral cavity via the same passageway for further therapeutic effects, as well as a biosensor attached to the mouthpiece in such a manner as to touch the skin of a user on the cheek.
Figure 7A:
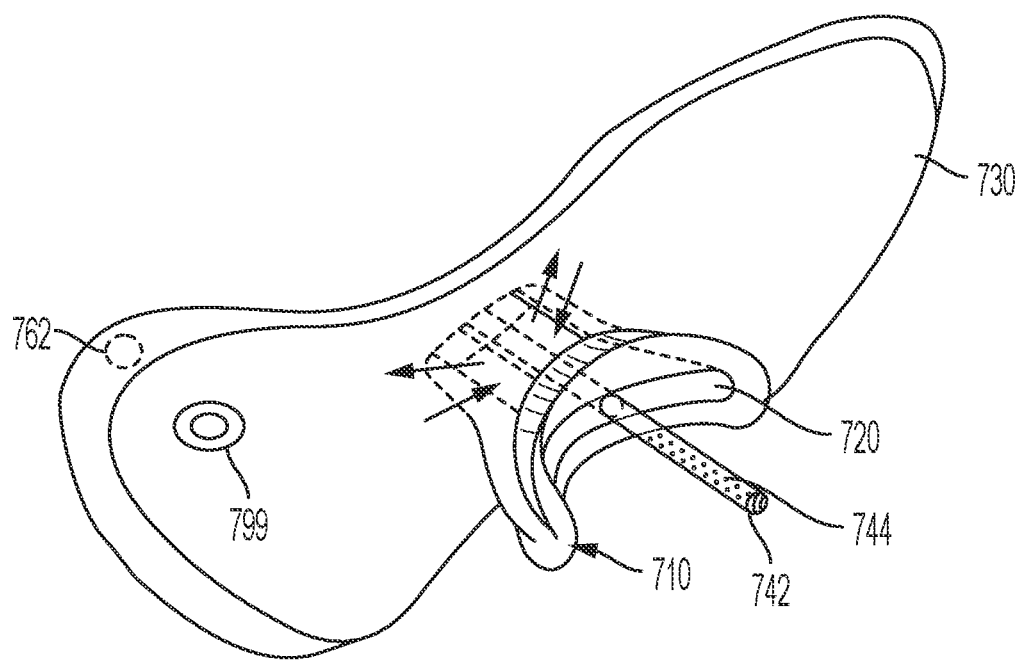
FIG. 7A is a posterior perspective view of an exemplary embodiment of another device in accordance with the subject disclosure including an external reservoir attached to a mouthpiece.
Figure 7B:
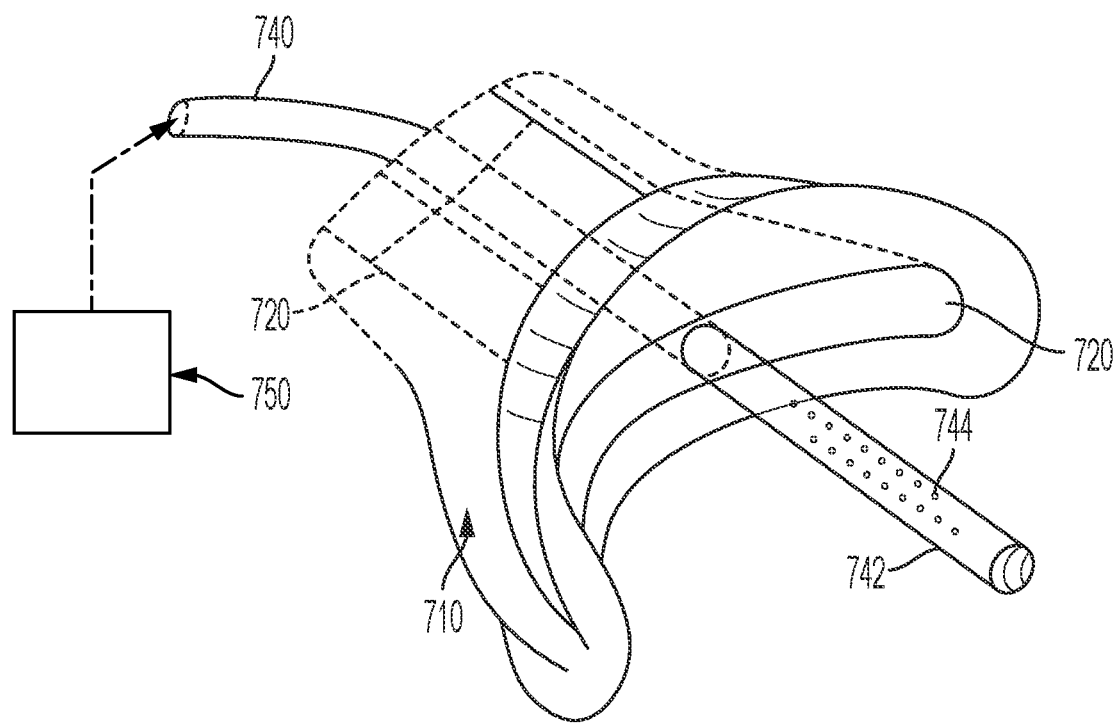
FIG. 7B is a posterior perspective view of a device in accordance with the subject disclosure showing in greater detail the mouthpiece passageway of FIG. 7.

FIG. 7 shows another exemplary embodiment of a device 700 according to the subject disclosure comprising a mouthpiece 710 and a source of pressurized therapeutic fluid 750. According to this embodiment, the mouthpiece 710 is enlarged and expanded to include a reservoir 730 outside the user's mouth and preferably also extending from the mouthpiece in a direction above a user's cheek, e.g., along at least one of the user's cheeks, to allow for space for the FOAM to partially coalesce and liquefy, and thus being a little heavier than the FOAM immediately coming up from the mouth, return by gravity into the user's mouth for further therapeutic benefit. In other words, the reservoir 730 extends from the mouthpiece 710 and is in fluid communication with an outlet passageway 720 for permitting therapeutic fluid to flow from the oral cavity to the reservoir and from the reservoir to the oral cavity under the influence of gravity. As depicted in FIGS. 7, 7A and 7B, a fluid inlet 740 connects to the mouthpiece 710 and by means of an extended fluid input conduit 742 which releases pressurized fluid through a plurality of small holes 744 into the oral cavity. The pressurized fluid mixes with saliva and/or other substance (such as toothpaste and water added before operating the device 700 or added along with the pressurized fluid (as discussed below in connection with FIG. 8) to create FOAM in the oral cavity. As more FOAM is created, the pressurized fluid and FOAM cause some of the FOAM to flow out of the oral cavity through the passageway 720 in the mouthpiece 710 and into the mouthpiece reservoir 730, along with the pressurized residual fluid. This rising FOAM in reservoir 730 is schematically depicted at 734. The reservoir 730 includes an outlet 762 for discharging therapeutic fluid received from the oral cavity into a fluid output conduit 760. That is, the residual pressurized fluid exits though the outlet 762 to fluid output 770 via the fluid output conduit 760 for safe disposal of the fluid.

The mouthpiece 710, passageway 720, and reservoir 730 form a sealed system, except for outlet 762. Each part, however, may be detached from another or opened in some manner (for example, a clamshell design) for periodic cleaning. Preferably, the reservoir 730 is located higher than most of the oral cavity, and it is large and wide enough to allow sufficient space and time for the FOAM to partially coalesce, liquefy, and descend, as schematically depicted at 736 and not overly interfere or oppose the counter-currents of rising FOAM 734. The passageway 720 provides a channel for both the rising FOAM 734 and descending FOAM 736 to exit and return, respectively, from and back to the oral cavity. Preferably, the channel or passageway 720 is large and wide enough to accommodate the counter-currents of lighter FOAM and heavier FOAM, as well as release any pressurized residual fluid. Preferably, the FOAM reaches to about level 738 (towards the upper second half of the reservoir 730), which allows space, as well as the time it takes for the FOAM to reach that level, for it to coalesce somewhat and return to the oral cavity for reuse.

Different combinations of pressurized fluid and substances in the oral cavity create the FOAM. One preferred combination for a basic oral hygiene regimen would be to use pressurized filtered air, medical grade oxygen, and/or ozone gas mixed with some other substances such as residual toothpaste and water. Acting together, these fluids would yield an excellent oxidative therapy and control, as necessary depending upon the concentration or the fluids and length of time in use, the pathogenic bacteria which cause tooth decay and gum disease. Preferably, using such fluids and diffusing them in combination with other substances, into the oral cavity, will create a robust amount of FOAM as these fluids come in contact with water, toothpaste, or various other substances already, or placed, in the oral cavity.

As depicted in FIG. 7, the reservoir 730 wraps around the outside of the user's mouth. It can be of any shape or size, located on only one side or both sides of a user's face, as long as it functions as described herein. The mouthpiece 710, passageway 720, and/or the reservoir 730 can be made in such a way as to move and/or swivel into various positions so that the outlet 762 is positioned above the level 738 of the FOAM and disposed above the mouthpiece whether or not the user is sitting, standing or reclining. To help hold the mouthpiece in place, it may be fitted with a strap (not shown) around the back of the neck or around the ears. Another embodiment, not shown, would be to use a large outlet or a container (in lieu of a mouthpiece/reservoir combination) which functions in a similar fashion. For example, similar to an IV bag suspended from a stand, a bag or container could function as a reservoir so that the FOAM would recycle as described herein.

A significant therapeutic benefit in terms of oxidative therapy is the user's ability to swish the FOAM and pressurized fluid between the teeth and all around the gums and other tissues in the oral cavity. Swishing is a gentle, but therapeutic action which can interact with crevicular fluids in the gum tissues and allow the oxidative therapy to reach down below the gum line and deep into periodontal pockets—to reach and kill the disease-causing anaerobic bacteria and help dissolve plaque. The FOAM contains thousands of tiny bubbles which can go everywhere. These microbubbles act both mechanically and chemically to dissolve biofilm and remove plaque. In the literature, oxidative therapies are credited with their ability to eliminate plaque and remove the "protective" seal which bacteria make as they multiply and form their little microscopic communities. The present invention allows one to swish the FOAM back and forth to remove plaque which in turn leads to tartar, calculus, tooth decay, and gum disease.

The FOAM reservoir 730, by virtue of its extra volume as compared to that in the oral cavity, allows the FOAM to partially coalesce and liquefy and return by gravity back through the outlet passageway 720. Upon returning to the oral cavity, the partially liquefied FOAM will once again come in contact with the pressurized fluid diffusing out of the small holes 744 of the extended fluid input conduit 742 in the confined space of the oral cavity and become lighter less-dense FOAM again, fill the oral cavity, rise into reservoir 730 in a never-ending cycle recirculating loop. Any residual pressurized fluid (hereinafter referred to as RPF) and any FOAM which does not return to the oral cavity, together comprising the fluid output 770, exit through the outlet 762 and through the output conduit 760 for disposal.

Preferably, there is a sufficient amount of FOAM to reach a critical level 738 inside reservoir 730. As the oral cavity becomes drier and drier, less and less FOAM is created, and the user will lose the ability to swish it back and forth between the teeth, etc. Therefore, before operating the device 700, the user can place some substances in the mouth (for example, unrinsed residual toothpaste after brushing and/or a sip of water) or add some substances into the oral cavity during operation of device 700 by pausing its operation for a moment or by adding some substances after beginning operation (discussed below in connection with FIG. 8).

Preferably, the design of the mouthpiece 710, outlet passageway 720, and reservoir 730 allows the FOAM to circulate as described herein without restrictions. The user's sensation of FOAM in the mouth stimulates the user's reflexes to close off the airway to the lungs and nasal cavity. While the present invention can be operated without FOAM, or any kind of liquid or substantive substance at all, using only dry pressurized gas as the chosen fluid (i.e., no liquid or another other substance at all in the mouth), the user would need to keep in mind to breathe only through the nose. This is easily done with a bit of practice.

The amount of FOAM in the oral cavity or residing in the reservoir 730, or even exiting to waste through the outlet 762, depends upon the FOAM's constituency, the characteristics of the incoming pressurized fluids, the amount of saliva, and any added substances in the mouth, if any. It also depends upon movements of the tongue, teeth, gums, and the position of the inlet(s) inside the mouth. Together these factors can push the FOAM out of the oral cavity with greater force, or the opposite, and allow more FOAM to remain or circulate in the oral cavity available for swishing. Preferably, the outlet 762 is slightly larger in diameter than the inlet 740 to accommodate the volume of the exiting FOAM and RPF and to minimize any restrictions while exiting the mouth. The inlet 740, outlet 762, and fluid output conduit 760 may be conveniently co-located on the same side of the mouthpiece 710 and the reservoir 730, fashioned as a coaxial conduit, or embedded and hidden in some fashion for convenience and esthetics. In FIG. 7, the arrows show the direction of the pressurized fluid and FOAM. A biosensor 799 carried by the reservoir 730 and touching the skin under the reservoir 730 can be added, if desired, to monitor a number of health conditions, etc. as discussed above, and transmit the data to the user by wireless transmission.

There are a number of ways for the user to use device 700. One way is to use it while reclining, for example while sitting back in a dental chair, an easy chair, or laying down at home. Presumably, one would recline for longer sessions (maybe as long as an hour or more). Another way is to use it while standing (such as using the water flosser) or sitting upright for shorter therapy sessions, presumably for a few minutes after brushing and/or flossing teeth. The method of use will depend upon the desired therapy. The longer the session, the greater the oxidative therapy and the deeper the fluids and the oxidative therapy will extend into the tissues of the oral cavity, restore and heal oral tissues, and dissolve into such tissues and the cardiovascular system. After each use, the present invention should be cleaned and allowed to dry.

FIG. 7A illustrates a perspective view of the mouthpiece 710 and the reservoir 730 of a variant of the device 700 shown in FIG. 7. The arrows in FIG. 7A show the direction of the pressurized fluid and the FOAM coming up from the mouthpiece passageway 720 and into the mouthpiece FOAM reservoir 730. As the FOAM starts to liquefy, it will return back down by gravity into the mouthpiece 710 through the outlet passageway 720 and into the oral cavity, wherein it will diffuse with the pressurized fluid and bubble up and become FOAM again and back up into the FOAM reservoir in a continuous loop. The residual pressurized fluid and FOAM will exit out of outlet 762.

FIG. 7B illustrates an enlarged perspective view of a portion of the device 700 showing in greater detail the mouthpiece outlet passageway 720 shown in FIG. 7.

Figure 7C:
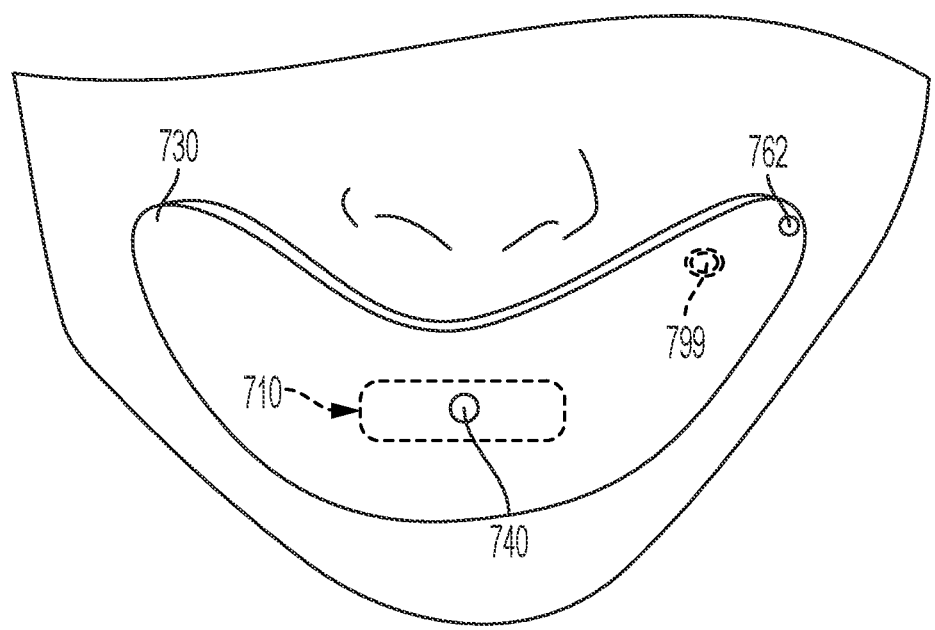
FIG. 7C is a partial front view of a user's face showing the device of FIG. 7A positioned in the user's mouth.

FIG. 7C illustrates a partial front view of a user's face showing how mouthpiece 710 is preferably positioned in the user's mouth and showing more detail of the reservoir 730 as shown in FIG. 7A.

Figure 7D:
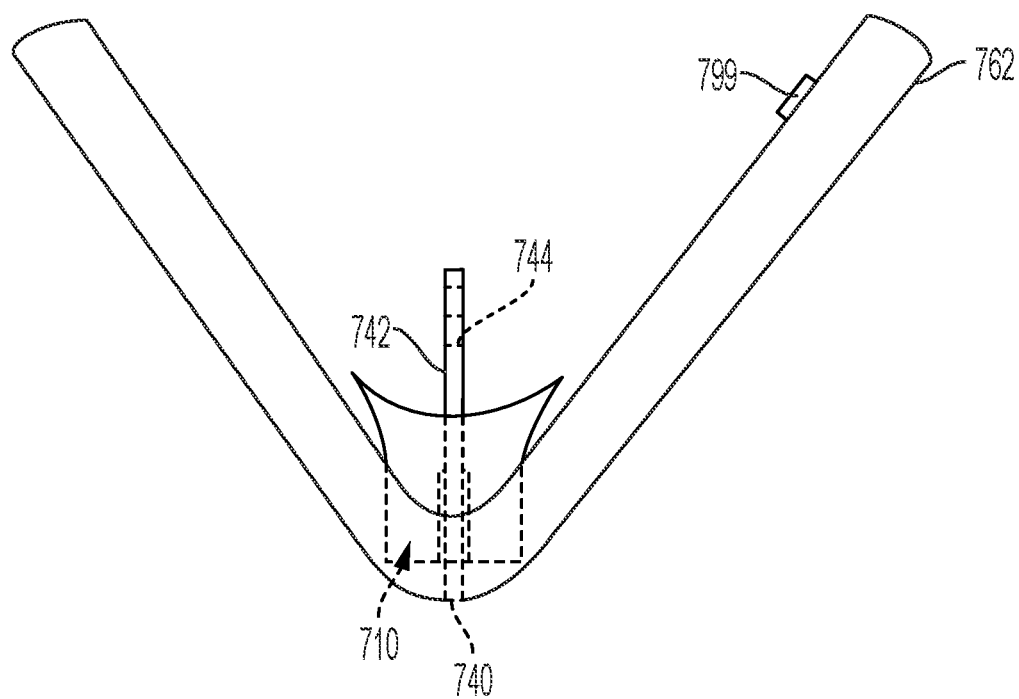
FIG. 7D illustrates a top plan view of the device of FIG. 7A.

FIG. 7D illustrates a top view of the device of FIG. 7C and showing more detail of the mouthpiece 710.

Figure 7E:
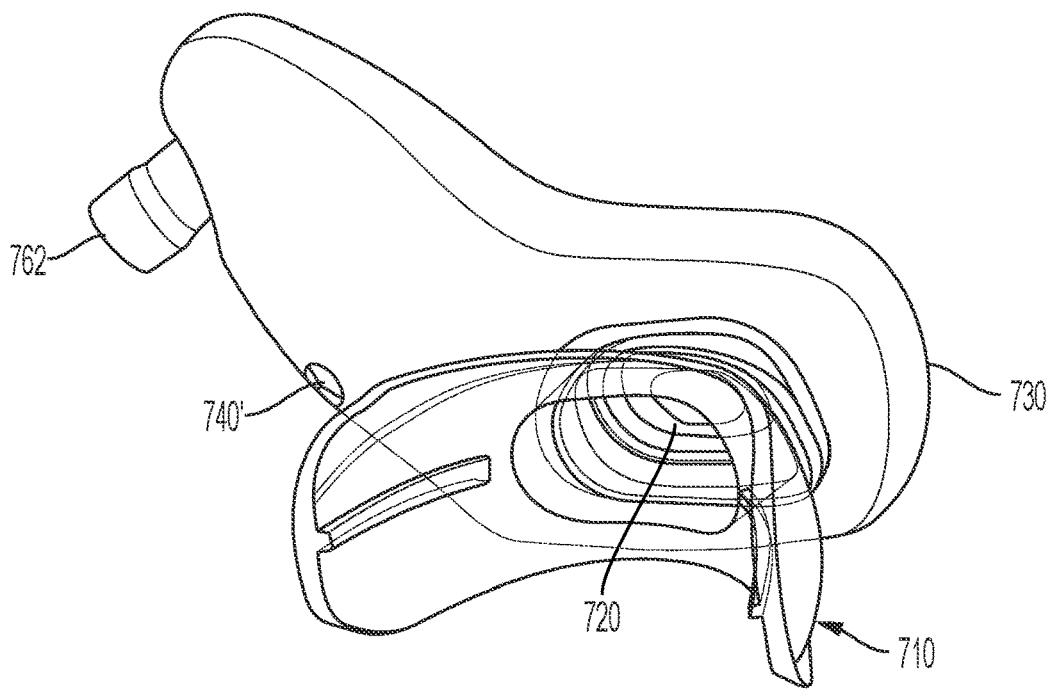
FIG. 7E is a posterior perspective view of a portion of another device in accordance with the subject disclosure including an external reservoir attached to a mouthpiece.

FIG. 7E is a perspective view of a portion of another device in accordance with the subject disclosure including an external reservoir 730 attached to a mouthpiece 710. As illustrated, the reservoir 730 includes an aperture 740' for receiving an inlet conduit (e.g., inlet conduit 740 of FIG. 7) for delivering pressurized therapeutic fluid through the outlet passageway 720, as well as an outlet 762 for discharging RPF and/or FOAM from the reservoir.

Figure 7F:
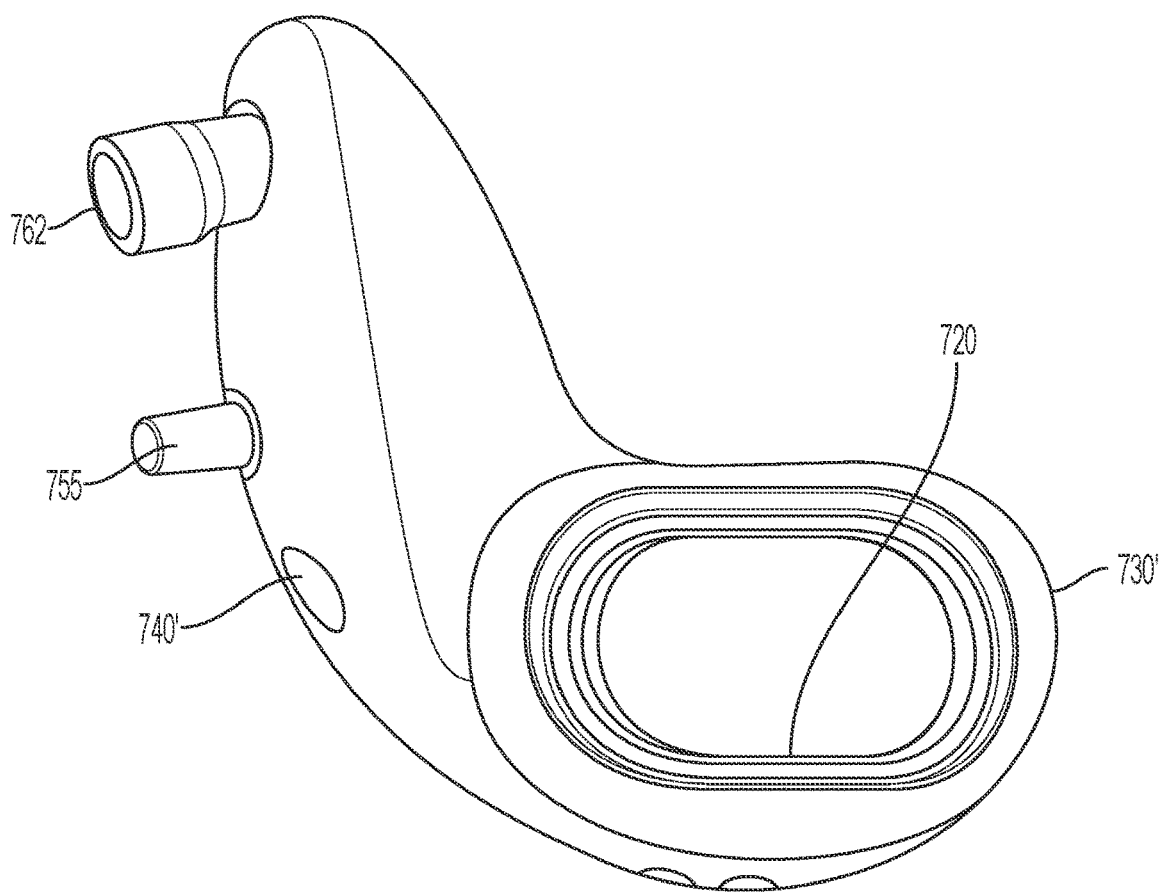
FIG. 7F is a posterior view of an external reservoir attachable to a mouthpiece (not shown)

FIG. 7F is a view of a reservoir 730' attachable to a mouthpiece (not shown) similar to mouthpiece 710 of FIG. 7E. The reservoir 730' is substantially similar in construction to reservoir 730 of FIG. 7E but further includes an inlet 755 for receiving a fluid, including, without limitation, water, ozonated water, and other therapeutic fluids described herein.

Figure 8:
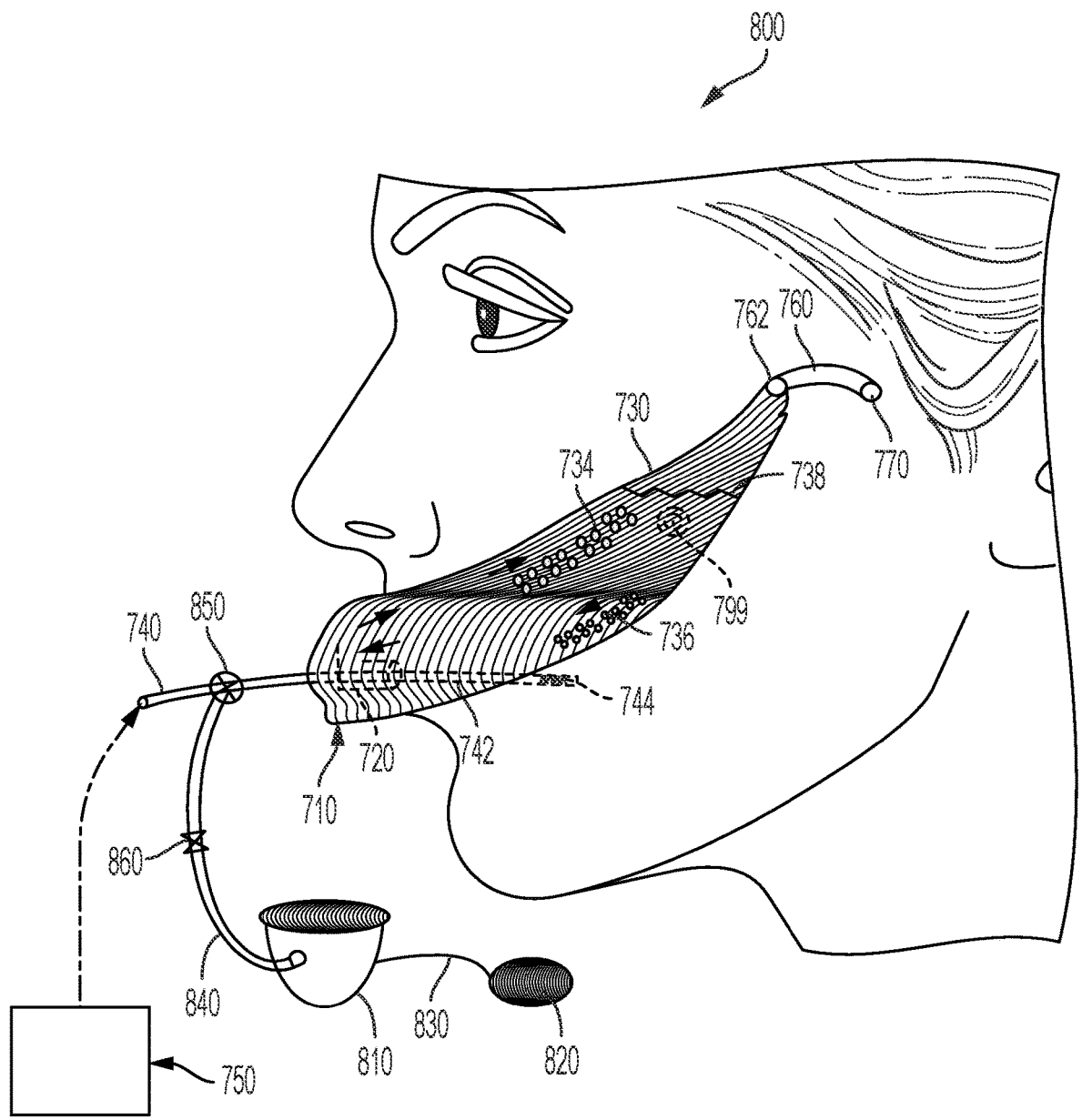
FIG. 8 is a side view of an exemplary embodiment of another device in accordance with the subject disclosure wherein pressurized fluid is mixed with additional therapeutic substances for injection into the oral cavity.

FIG. 8 shows another exemplary embodiment of a device 800 according to the subject disclosure comprising a mouthpiece 710 and a source of pressurized therapeutic fluid 750. By virtue of the construction of the device 800 various substances can be added to incoming pressurized fluid. Device 800 operates in a manner similar to device 700 of FIG. 7 but, in addition, has the additional feature of being able to allow the user to add various therapeutic substances while operating the device. As shown in FIG. 8, the user can squeeze a compressible squeeze bottle 820 which sends pressurized air through conduit 830 to force substances contained in a container 810 into the pressurized fluid inlet 740 via conduit 840 by means of a three-way connector and selector valve 850. The purpose is to add various therapeutic substances into the pressurized fluid before it enters the oral cavity. Since any substances added must overcome the pressure of the incoming pressurized fluid, a manually operated squeeze bottle 820 is preferably used. Another embodiment in lieu of a container 810 is to have the squeeze bottle itself filled with substances instead of air. In this case, a fillable squeeze bottle would have to be used. Any suitable pressure pump system or gravity system which could force the substances into the pressurized fluid would also work.

Such therapeutic substances may include, but are not limited to, plain water, medications for therapeutic effect, antiviral solutions, nitric oxide generating solutions and powders in various forms which can be mixed into a liquid, ozonated water, salt water, baking soda, teeth whitening solutions, iodine, essential oils, hydrogen peroxide, apple cider vinegar, teeth remineralizing solutions, teeth and gum growth factors and/or stem cell activators, hot or cold water, etc., and any other substance which may be administered to improve the health or condition of the teeth, gums, tongue, sinuses, lips, cheeks, glands, parts of the head and upper body (including the face, neck, head), to whiten the teeth, or to allow for such substances to be administered into the bloodstream by the sublingual and buccal routes for the possible treatment of bacterial, fungal, viral, or other infections, diseases of all kinds, or simply to lower the body temperature. Such therapeutic substance may be administered directly into the inlet conduit 740 as mentioned above or connected and sealed to the mouthpiece 710 and enter the oral cavity by that route. To prevent flow in the opposite direction, the line 840 supplying the therapeutic substances should have a check-valve 860 downstream of the container 810 to prevent any backflow into the container 810 and/or otherwise withstand any pressures from the inlet conduit 740 or out the mouthpiece 710. If a squeeze bottle by itself is used in lieu of a container 810 (as described above), the squeeze bottle could be used to direct fluids into a separate line connecting directly to an inlet 755 as depicted in FIG. 7F, with a check valve provided in the line to prevent backflow from any pressurized fluids inside the reservoir 730.

FIG. 9 shows another exemplary embodiment of a device 900 according to the subject disclosure comprising a mouthpiece 910 and a source of pressurized therapeutic fluid 920. In particular, device 900 is used in combination with a conventional oral hygiene water flosser. The mouthpiece 910 has a flexible membrane 940 that includes a lip engaging surface 912 and a manually adjustable inlet 942. The lip engaging surface 912 surrounds the flexible membrane 940 for sealing the oral cavity from an external environment when the lip engaging surface is engaged by a user's lips. The manually adjustable inlet 942 delivers the therapeutic fluid to the oral cavity of the user when the oral cavity is sealed from the external environment by a user's lips in engagement with the lip engaging surface 912. The mouthpiece 910 further comprises an outlet 962 for enabling egress of the therapeutic fluid from the oral cavity when the oral cavity is sealed from the external environment by a user's lips in engagement with the lip engaging surface 912. Device 900 further comprises an outlet conduit 960 extending from the outlet 962 for receiving therapeutic fluid from the oral cavity.

Figure 13:
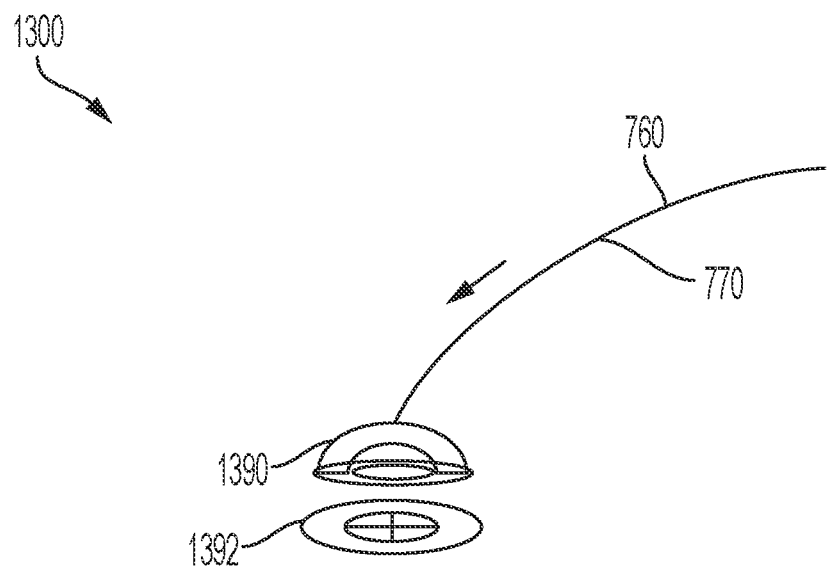
FIG. 13 is a view of an outlet conduit of a device according to the subject disclosure through which residual pressurized fluids and FOAM is deposited down a drain for safe disposal.

As shown in FIG. 9, the pressurized fluid source 920, preferably a conventional water flosser machine with a typical fluid container and fluid pump, causes water to flow to a water flosser instrument 930 and through the manually adjustable inlet 942 in the flexible membrane 940 of the mouthpiece 910. The fluid from the pressurized fluid source 920 is ejected through a water jet 950 (FIG. 9C) which is extended into the oral cavity and which the user manipulates by hand to clean around the teeth and gums. The residual pressurized fluid exits through outlet 962 through conduit 960 to waste, for example, down a drain (as shown in FIG. 13), or to a container (as shown in FIG. 4, which can be a component of the water flosser itself) designed to retain the fluid output at 970. That is, the fluid output at 970 can be reused as the source fluid 920 for the water flosser machine (not shown) to operate in a continuous loop. If ozonated water is used, as also depicted in FIG. 4, the fluid from the pressurized fluid source 920 may be recirculated as well. If the pressurized fluid is recirculated in a continuous loop, it may be preferable for some users to wash the mouth and teeth with a "first pass" to rid the oral cavity of food particles and then connect the output conduit 960 to the container for the same reasons as stated above in connection with the description of FIG. 3. Moreover, the water flosser unit may be fitted with a filter, similar to filter 342 illustrated in FIG. 3.

The mouthpiece's flexible membrane 940 can stretch in all directions to make it easier for the user to manipulate the water flosser. The membrane inlet 942 can be a reinforced small hole which stretches just enough to keep a seal around the flosser instrument when it is inserted through the membrane, yet able to accommodate various sized water flosser instruments. The inlet 942 may also be custom-made to fit a given brand of water flosser instrument 930 in such a way as to be able to fit in a snug manner (i.e., without leaking water or other fluids) and be able to slide back and forth in the inlet.

In addition, the lip engaging surface 912 can have elastic properties such that it springs back and resists being deformed. Preferably, the lip engaging surface 912 "pushes" slightly against the lips to create a liquid seal at all times, but is also comfortable for the user. The lip engaging surface 912 is shaped to curve along the surface of the frontal facial part of the lips and around to the back of the lips along the surface of the inside of the lips of the user so the mouthpiece 910 when it is inserted fits snug against the lips and it helps the user hold the mouthpiece in place. The lip engaging surface is slightly curved and circles the lips so as to fit the generally convex contours of the face and lips of the user.

Device 900 as depicted in FIG. 9 solves one of the chief complaints from users of conventional water floss machines—that the sink, floor, and immediate area become wet as water splashes all over the place upon exiting a user's mouth. Device 900 also negates the need to lean over a sink while water flossing one's teeth.

Figure 9A:
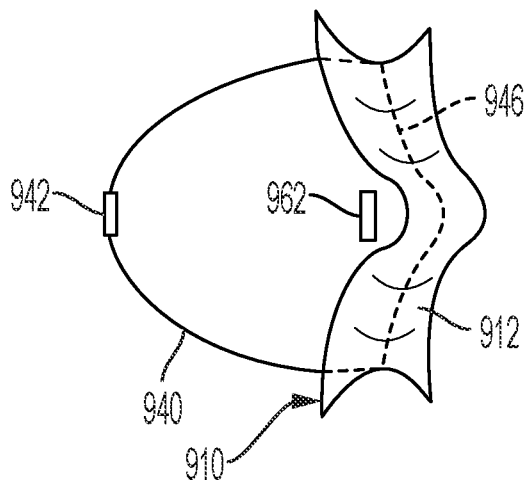
FIG. 9A is a side view of a mouthpiece of the device of FIG. 9.

FIG. 9A illustrates a side view of the mouthpiece 910 illustrated in FIG. 9 including the approximate location of a seam 946 which attaches the flexible membrane 940 to the lip sealing surface 912.

Figure 9B:
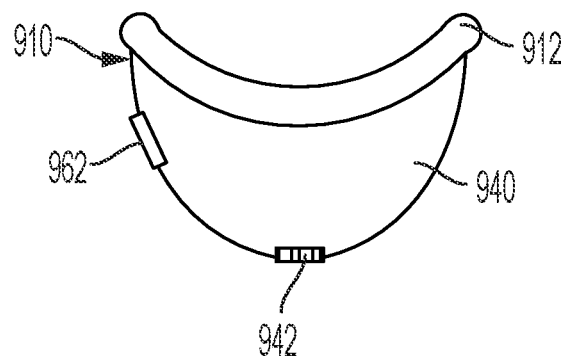
FIG. 9B is a top plan view of a mouthpiece of the device of FIG. 9.

FIG. 9B illustrates a top view of the mouthpiece 910 as illustrated in FIG. 9 and shows that the flexible membrane 940 preferably extends anteriorly of the lip engaging surface 912.

Figure 9C:
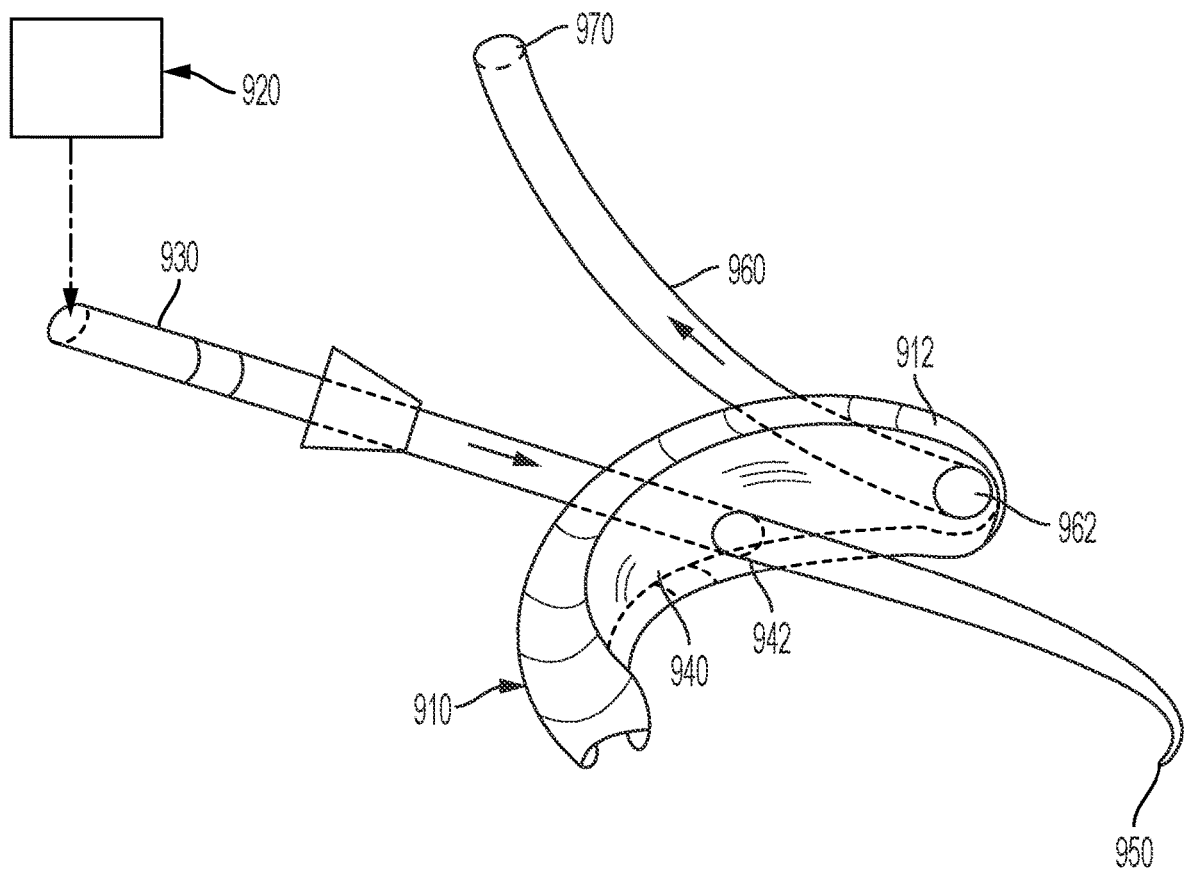
FIG. 9C is a posterior perspective view of the device of FIG. 9.

FIG. 9C illustrates a perspective view of mouthpiece as illustrated in FIG. 9 with the water flosser jet 950 inserted through the inlet 942 and into the oral cavity of a user (not shown).

Figure 9D:
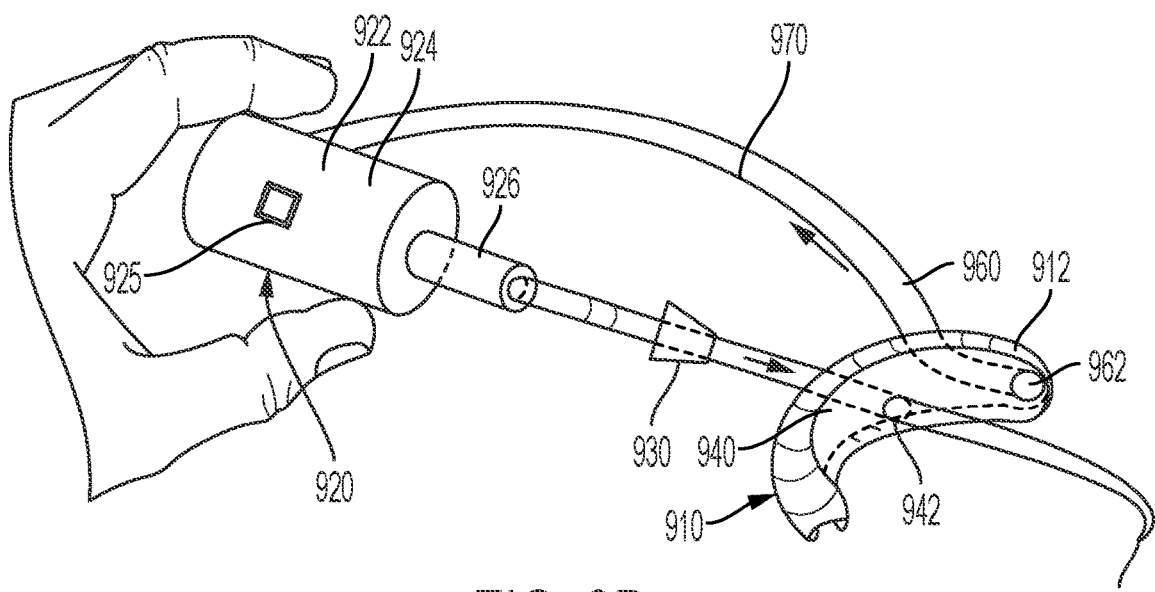
FIG. 9D is a view similar to FIG. 9C wherein the device is used with a portable water flosser.

FIG. 9D illustrates another use of the mouthpiece 910 wherein it is used with a portable water flosser 922. A water flosser, whether conventional as in FIG. 9 or a portable unit as in FIG. 9D, includes a source of pressurized fluid comprised of a fluid container 924 and a fluid pump 926, and various controls (not shown) to adjust the flow and pressure of the fluid. As shown in FIG. 9D, the pressurized fluid enters the oral cavity through sealed mouthpiece 910 and is forced out of a water flosser jet 950 (to clean the teeth, gums, tongue, etc.). Afterwards, the fluid exits through the sealed outlet 962, through conduit 960 and back to the fluid container 924 which supplies the fluid to the fluid pump 926 in a continuous recirculating loop. The portable water flosser container 924 can be filled through a fill port 925 with various substances, including hydrogen peroxide, ozonated water (although the ozone dissipates quickly in water without a constant supply of ozone gas diffusing into it), etc. Using a continuous recirculating loop, especially with a portable water flosser which normally has a very small supply of pressurized liquid, obviates the need to stop and refill the portable flosser multiple times during an average cleaning session. In another embodiment, the fluid output 970 could be sent via conduit 960 to a separate container 1280, as in FIG. 12, or down a sink, as shown in FIG. 13. Further, as mentioned above, the portable water flosser unit may be provided with a food particle removal filter 342 and an easy connect and disconnect for the output line as described above in connection with FIGS. 3 and 9.

Figure 9E:
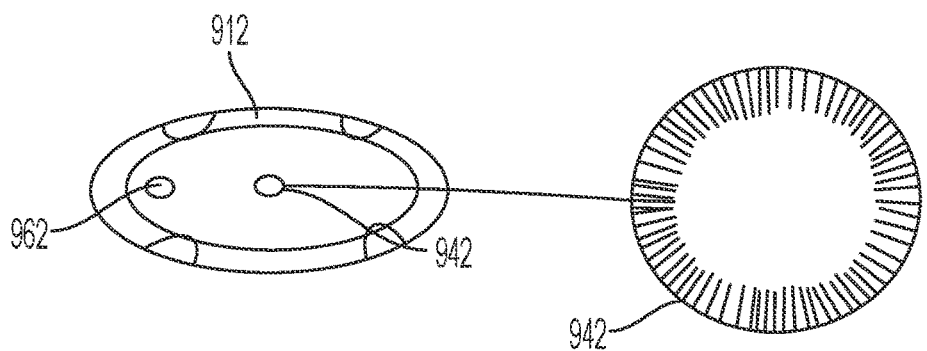
FIG. 9E is a front view of a mouthpiece according to the subject disclosure showing details of the inlet opening of a mouthpiece membrane.

FIG. 9E illustrates exemplary details of the inlet 942 of the flexible membrane. The opening of inlet 942 can be made in many different ways to prevent the pressurized fluid from splashing out of the mouth while using the present invention. FIG. 9E shows one example whereby tiny fibers are attached to the inlet 942 and surround the inlet opening and extend to and surround the water flosser jet 950. The fibers prevent pressurized fluid from escaping and also allow the water flosser jet 950 to move back and forth freely to allow the user to reach all teeth and gums.

Figure 9F:
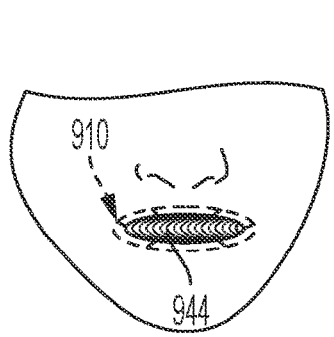
FIG. 9F is a partial front view of a user's face showing another exemplary embodiment of a mouthpiece according to the subject disclosure wherein the mouthpiece includes a semi-sealed membrane.

FIG. 9F illustrates wherein the mouthpiece 910 is sealed with a semi-sealed flexible membrane 944. The semi-sealed flexible membrane 944 can be made from a fine mesh such as carbon fibers or any natural or synthetic materials of any kind. Preferably, it has elastic properties which allows the material to return to its previous mesh shape after a water flosser instrument 930 is inserted and later removed after use. The mesh forming the semi-sealed membrane 944 would be fine enough to prevent liquid from going through it, but not too fine that air cannot pass. For example, a user could breathe through it but liquids would be unable to pass through.

Figure 9G:
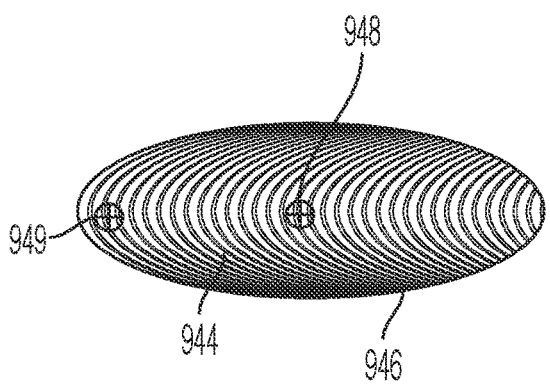
FIG. 9G is an enlarged front view of the mouthpiece FIG. 9F.
Figure 9H:
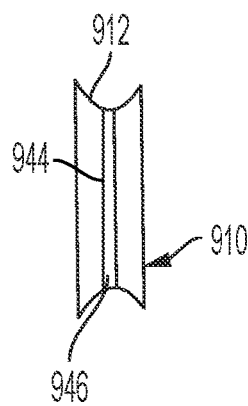
FIG. 9H is a partial side view of the mouthpiece FIG. 9F.

FIG. 9G illustrates details of the mouthpiece 910 with a semi-sealed flexible membrane 944 wherein the user can decide where to puncture the membrane. By way of example but not limitation, the user could make an inlet hole 948 in the center of the membrane and an outlet hole 949 towards the side of the mouth. FIGS. 9G and 9H also shows an example of how a seam 946 would connect the membrane 944 to the lip sealing surface 912.

FIG. 9H also illustrates that the flexible membrane may, in one embodiment, be substantially coextensive with, i.e., does not extend anteriorly or posteriorly of, the lip engaging surface 912. The lip engaging surface 912 may partially "clamp" the lips or may more fully clamp the lips as illustrated in FIG. 9J below which illustrates a c-clip 913 lip engaging surface. Preferably, the lip engaging surfaces 912, 913 will follow the curves of the face and lips as noted above, although in FIG. 9H such curve and shape are not shown.

Figure 9I:
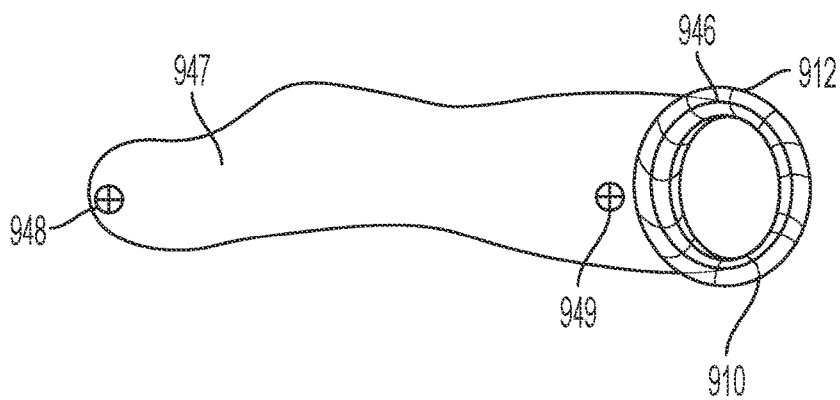
FIG. 9I is a posterior perspective view showing another exemplary embodiment of a mouthpiece according to the subject disclosure.
Figure 9J:
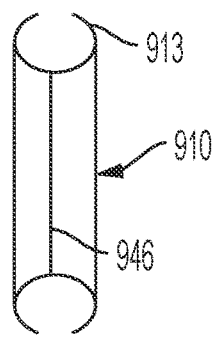
FIG. 9J is a partial side view of another exemplary embodiment of a mouthpiece according to the subject disclosure wherein the mouthpiece includes a sealed membrane with C-shaped lip engaging surface.

FIG. 9I illustrates a perspective view of the mouthpiece 910 which includes an elongated flexible membrane 947 in which the user can make the inlet 948 and outlet 949 at places the user prefers. Preferably the membrane 947 is completely sealed and will not allow air, water, or any other fluids of any kind to pass through. Preferably, the membrane 947 is soft, flexible, somewhat elastic, and can be made out of materials of all kinds. Preferably, the membrane 947 is attached to the seam 946 in such manner as to enable the membrane to extend in any direction, in or out, or vice-versa. The membrane 947 can be any length or size.

FIG. 9J illustrates a side view of the present invention according to one embodiment wherein the mouthpiece 910 is fitted with a c-clip lip engaging surface 913 in order for the user to more easily hold the mouthpiece 910 in place. As mentioned above in regards to FIG. 9H, the mouthpiece 910 and lip engaging surface 913 will be made of any materials which are soft, flexible, and elastic so that it retains its shape and curves around and follows the contours of the face, lips, etc. The c-clip lip engaging surface may be made in such a way that it clamps around the lips, but it is not uncomfortable.

Figure 10:
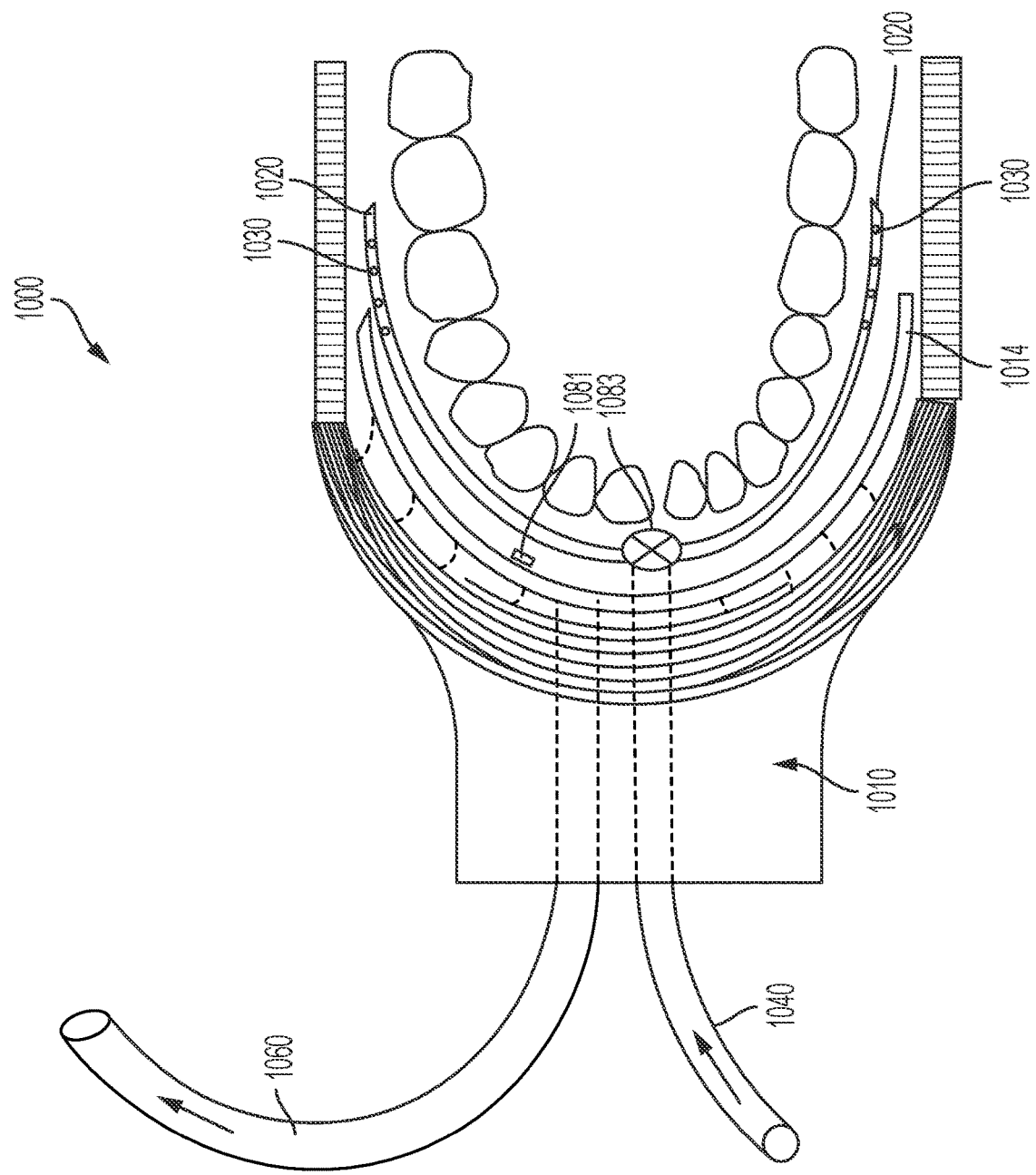
FIG. 10 is a view of another exemplary embodiment of a device according to the subject disclosure wherein a fluid inlet of a mouthpiece thereof includes two fluid input conduits, each of which extends into a different part of the oral cavity, as well as a biosensor embedded in the mouthpiece.
Figure 10A:
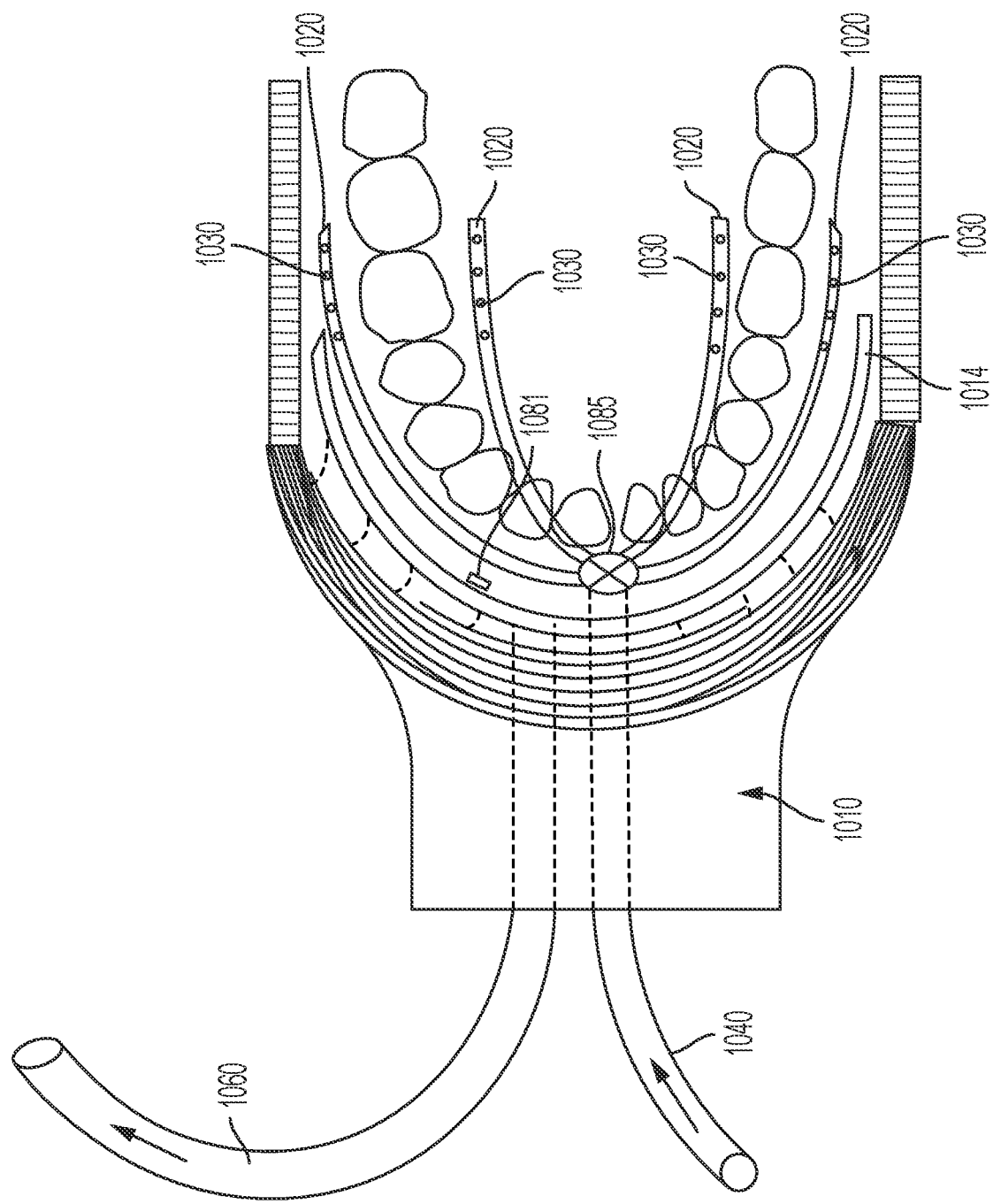
FIG. 10A is a view of another exemplary embodiment of a device according to the subject disclosure wherein a fluid inlet of a mouthpiece thereof includes four fluid input conduits, each of which extends into a different part of the oral cavity, as well as a biosensor embedded in the mouthpiece.

FIGS. 10 and 10A illustrate two embodiments of a mouthpiece 1010 according to the subject disclosure wherein the inlet conduit 1040 includes a plurality of secondary conduits extending from a proximal end of the inlet conduit for delivering therapeutic fluid to a plurality of areas in the oral cavity. In particular, FIG. 10 shows two secondary conduits 1020 extending into the oral cavity, whereas FIG. 10A illustrates four secondary conduits 1020 extending into the oral cavity. All of the secondary conduits have a plurality of small holes 1030 to diffuse the fluid. FIG. 10 shows two secondary conduits 1020 on each side of the mouth along the buccal area. FIG. 10A shows four secondary conduits 1020 on both sides of each row of teeth. Preferably, the secondary conduits 1020 are flexible and comfortable enough to allow the user to position them all over the mouth, including as shown in FIG. 10, the buccal area, as well as both under and on top of the tongue. Similar to the inlet diffuser holes 220 discussed in connection with FIG. 2, the secondary conduit diffuser holes 1020 should be sized for the type of pressurized therapeutic fluid and substances to be used with the device. For example, different mouthpiece and inlet/secondary conduit combinations can be used for different therapeutic substances, as needed. Also illustrated is a three-way connector 1083 (FIG. 10) to split the inlet conduit 1040 into two secondary conduits 1020, and a five-way connector 1085 (FIG. 10A) to split the inlet conduit 1040 into four secondary conduits 1020. The connectors 1083 and 1085 may be reinforced and used as a place to rest the teeth or as a bite point to allow the user to hold the mouthpiece 1010 in place and keep it sealed. In an alternative embodiment, the device may use connectors (not shown) which are upstream of the mouthpiece 1010 (i.e., before reaching the mouthpiece) which enter through a hollowed section of the mouthpiece. Alternatively, the device can include multiple secondary conduits molded into the mouthpiece itself, so that as the inlets reach the oral cavity and extend inside, the user has complete freedom of movement to manipulate and/or swish the fluid or FOAM inside the oral cavity.

In addition, a biosensor 1081 can be carried by the mouthpiece 1010, e.g., attached to the inner flange 1014 of the mouthpiece, for detecting a number of biomarkers and conditions (such as pH, glucose levels, minerals, temperature, etc., discussed above) which the user can monitor by wireless transmission.

Any method of diffusing the fluid and/or substances inside the oral cavity is acceptable, whether the fluid is diffused from a diffuser array in the mouthpiece itself or an inlet/secondary conduit extending into the oral cavity made with holes to diffuse the fluid more evenly, as long as it is comfortable and allows the fluid to be released in smaller bubbles if the fluid is a pressurized gas. The smaller the bubbles, the greater the fluids dissolve and the smaller the microbubbles for the creation of FOAM. If the fluid is a pressurized liquid, larger diffusing holes may be needed to allow the liquids to be dispersed, and/or for alternative embodiments, jetted out the holes against the gums and spaces in between the teeth. Some embodiments may have pressurized fluids that are combined, for example, a pressurized liquid entering the oral cavity in one inlet(s) and pressurized gas simultaneously entering the oral cavity in another inlet, such as the use of multiple diffuser arrays 145 in the mouthpiece. Smaller microbubbles of the FOAM will have greater potential to permeate all spaces in the oral cavity.

Preferably, at least one diffuser array in the mouthpiece or one inlet/secondary conduit is long enough to reach the back of the mouth and reach the upper and lower rows of teeth and gums. If two or more extended inlets/secondary conduits or diffuser arrays in the mouthpiece are used, they may be controlled by a valve (not shown) manually or electronically operated to favor one or more diffuser array or inlet/secondary conduit (for example, to direct the flow of pressurized fluid to the left, right, upper, or lower part of the mouth or to a particular area).

A variety of diffuser arrays and extended inlets/secondary conduits can be used according to different embodiments of the present invention. Some can be designed to direct "jets" of the therapeutic substances, fluids, or FOAM to particular areas inside the mouth and be capable of extending to the back of the oral cavity (rear molars, under the tongue, or between the molars and cheeks, etc.) or to create a cross-stream from the outer rows of teeth and gums (or vice versa) and spaces in between the teeth for optimum cleaning or other therapeutic effects.

For users unable or disinclined to swish pressurized fluid of FOAM back and forth between the teeth due to disease or lack of ability, diffuser arrays and extended inlets/secondary conduits can be shaped in the form of unsealed and non-hyperbaric "H-shaped" trays that go around the upper and lower rows of teeth simultaneously, or a more conventional styled tray for each upper and lower row of teeth. Such trays can have flaps down the edges past the gum line to send the pressurized fluids into the gum and/or periodontal pockets. Such an H-tray (or conventional upper or lower tray) may come in different designs so that the fluid and FOAM may still swish back and forth over the teeth and gums and/or spaces therebetween, using positive and/or negative pulses of the pressurized fluid. In addition, a small venturi can be connected to an inlet/secondary conduit to return any FOAM from the sublingual spaces. The intent would be to focus the therapeutic fluid in certain areas, but allow the fluid and FOAM to then permeate the entire oral cavity. Such diffuser arrays could also be adjustable by the user. Extended inlets/secondary conduits may be rigidly connected to the mouthpiece or loosely fit. They may be designed so that when the user is in a reclining position, the fluid is released at the back of the trays so that the fluid and FOAM bubble up through the rows of teeth. In the reclining position, the user's face facing upwardly, the back of the trays would be the "bottom-most" position of the trays.

The diffuser arrays and extended inlets/secondary conduits, according to another exemplary embodiment, can operate with alternating positive and negative pressure pulses in such a manner as to pull bacteria, various microbes, metabolites, and waste products from the crevicular spaces between the teeth and gums.

According to another exemplary embodiment, the diffuser arrays and extended inlets/secondary conduits can be constructed to move about, gyrate, or rotate with tiny brushes (like a car going through a carwash) by action of the current and forces of the incoming pressurized fluid to clean surfaces and tissues in the oral cavity.

According to another exemplary embodiment, the diffuser arrays, the mouthpiece itself and extended inlets/secondary conduits can include with sensors to measure the depth of periodontal pockets and automatically record such readings. Nanotechnology, miniaturization of electronics, sensors, etc., may allow "sonar" type readings of the pockets and send the information wirelessly to other electronic devices for evaluation.

According to another exemplary embodiment, the diffuser arrays, the mouthpiece itself and extended inlets/secondary conduits can be provided with sensors and/or valves to automatically open and shut the pressurized fluid to facilitate swishing FOAM back and forth between teeth. Another exemplary embodiment can include alternating inflatable and collapsible diffuser arrays and/or extended inlets/secondary conduits along the rows of teeth to facilitate the fluid and FOAM to reach deep into the crevicular fluid with push/pull motions.

According to another exemplary embodiment, the diffuser arrays, the mouthpiece itself and extended inlets/secondary conduits can contain optic fibers to allow various forms of "light therapy" (including UV, infrared or red light, various blue lights, or other forms of radiation of the entire electromagnetic spectrum) whereby light is radiated inside the oral cavity to regenerate tissues and/or eliminate pathogens, or to create advanced oxidation products (AOPs) for even greater oxidation potential to kill bacteria and other pathogens. Such radiation may also stimulate the body's natural stem cells.

According to another exemplary embodiment, the diffuser arrays, the mouthpiece itself and extended inlets/secondary conduits can produce ultrasonic vibrations to remove plaque or calculus, etc., or for other purposes. Alternatively, they may create and induce an electrical potential, adjusting voltage and current, and/or using other electrical effects and/or materials for the purpose of adjusting the pH to prevent demineralization and/or fostering remineralization, whiten teeth, and/or other effects for further cleaning, and the prevention of tooth decay and gum disease.

According to another exemplary embodiment, the diffuser arrays, the mouthpiece itself and extended inlets/secondary conduits can be constructed to propagate or generate sounds, such as a hum which is known to cause the nasal passages to produce nitric oxide, or to generate or propagate sounds for relaxation of the user.

According to another exemplary embodiment, the diffuser arrays and extended inlets/secondary conduits can be constructed to be synchronized with mechanical braces or the like which fit around the user's mouth, jaw, cheeks and/or lips to help maintain a seal of the oral cavity and prevent the mouthpiece from losing its seal upon higher pressures in the oral cavity. A corresponding air pressure can be applied into the nose with a specially designed "nose mask" which seals and equalizes the higher pressures in the oral cavity. The mechanical braces, with or without the special nose mask, allow for more pressure to be applied inside the oral cavity for hyperbaric oxygen therapy ("HBOT"), although it is expected that the pressures exerted will be less than those in typical hyperbaric chambers.

According to another exemplary embodiment, the diffuser arrays and extended inlets/secondary conduits can be provided with an adjustable valve such for increasing or decreasing the pressure inside the oral cavity in order to increase absorption of any fluid or FOAM into the tissues. The valve can have an automatic relief set to a safe pressure level.

Figure 11:
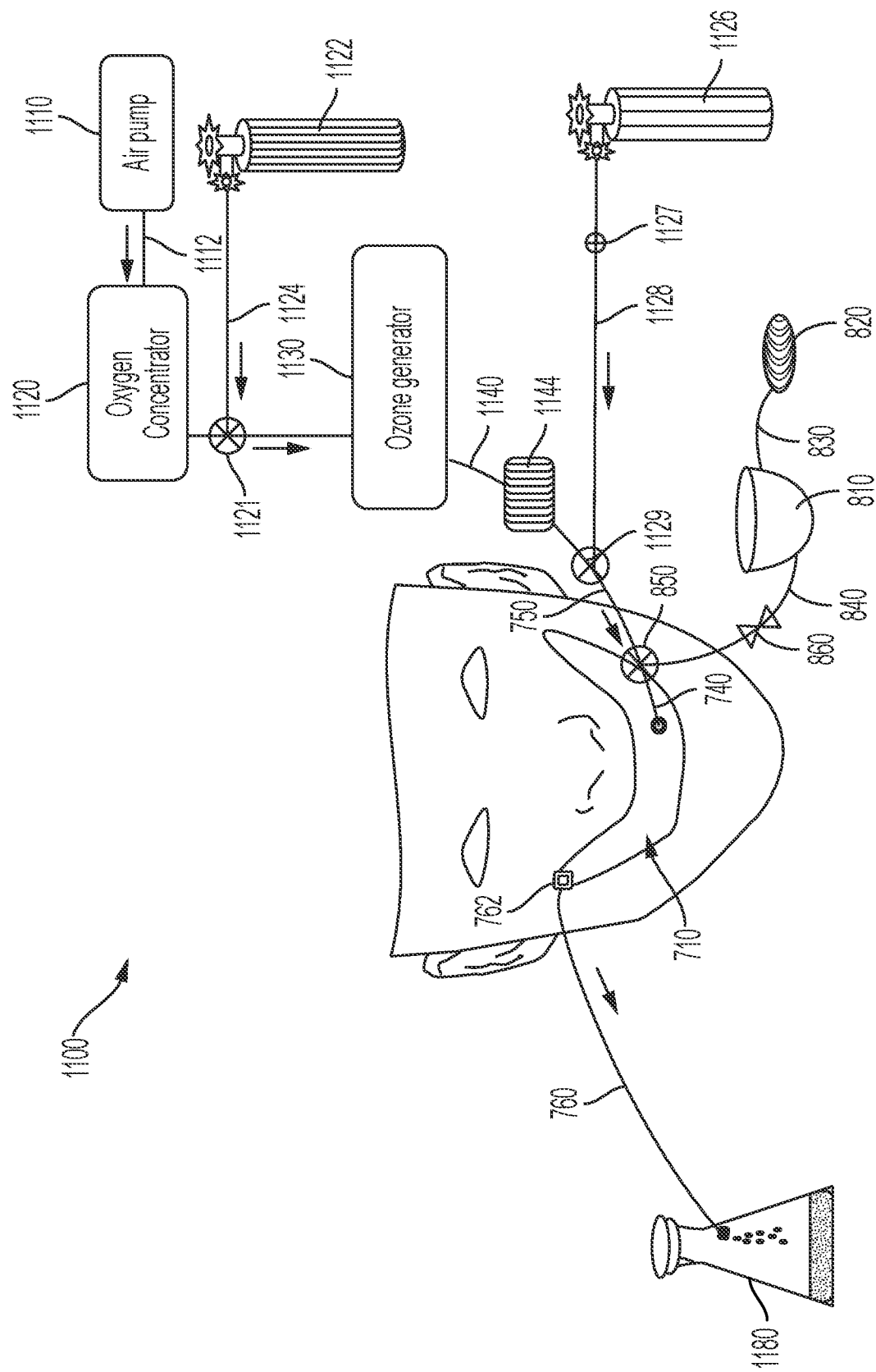
FIG. 11 is a view of another exemplary embodiment of a device according to the subject disclosure wherein the user can select from various sources of pressurized fluids and substances for introduction into the oral cavity while using the device.

FIG. 11 shows an alternative exemplary embodiment of a device 1100 according to the subject disclosure including a mouthpiece 710 and various sources of pressurized therapeutic fluids in the form of pressurized gas canisters or tanks and depicting how various pressurized therapeutic fluids and substances may be used individually, in combination, or in sequence, while operating the device 1100. To accomplish certain therapeutic results, different fluids may be selected for different reasons at different times even in the same operating session using the device 1100. For example, for a few minutes at the beginning of a treatment session, perhaps only medical grade oxygen is used. Later in the same session, perhaps ozone gas or nitric oxide gas is used one after the other, or in combination, or some other therapeutic gas (connected in similar ways as the gases represented in FIG. 11) may be introduced. To achieve these ends, the user would simply turn source(s) of pressurized therapeutic fluid on and off as desired. A typical device arrangement can include a an air pump 1110, concentrated oxygen from an oxygen concentrator 1120 and/or medical grade oxygen gas 1124 from an oxygen gas cylinder 1122 selectively introduced via two-way connector and selector valve 1121. The aforementioned oxygen gas, ozone gas from an ozone generator 1130 and/or nitric oxide gas 1128 from a nitric oxide gas cylinder 1126 (which desirably flows through a gas flow limiting valve 1127), depending upon which therapeutic effect is intended by opening three-way connector and selector valve 1129 which can select which gas is to be used as the pressurized fluid 750 directed by inlet conduit 740 into the oral cavity. Optionally, the user may select ozonated water 1144 as the source therapeutic fluid and/or add other therapeutic substances 810. More specifically, the user can squeeze a compressible squeeze bottle 820 which sends pressurized air through conduit 830 to force substances contained in a container 810 into the pressurized fluid inlet 740 via conduit 840 by means of a three-way connector and selector valve 850. The purpose is to add various therapeutic substances into the pressurized fluid before it enters the oral cavity. Since any substances added must overcome the pressure of the incoming pressurized fluid, a manually operated squeeze bottle 820 is preferably used. In addition, to prevent flow in the opposite direction, the line 840 supplying the therapeutic substances should have a check-valve 860 downstream the container 810 to prevent any backflow into the container 810 and/or otherwise withstand any pressures from the inlet conduit 740 or out the mouthpiece 710.

After entering the oral cavity, any residual pressurized fluid and or FOAM 770 (FIGS. 12 and 13) exits through the outlet 762, flows through the outlet conduit 760 and goes to waste for safe disposal, which may be a sealed container 1180 which serves to retain any residual FOAM and/or therapeutic fluid and neutralize any toxic fluid, turning ozone gas, for example, into oxygen.

Figure 12:
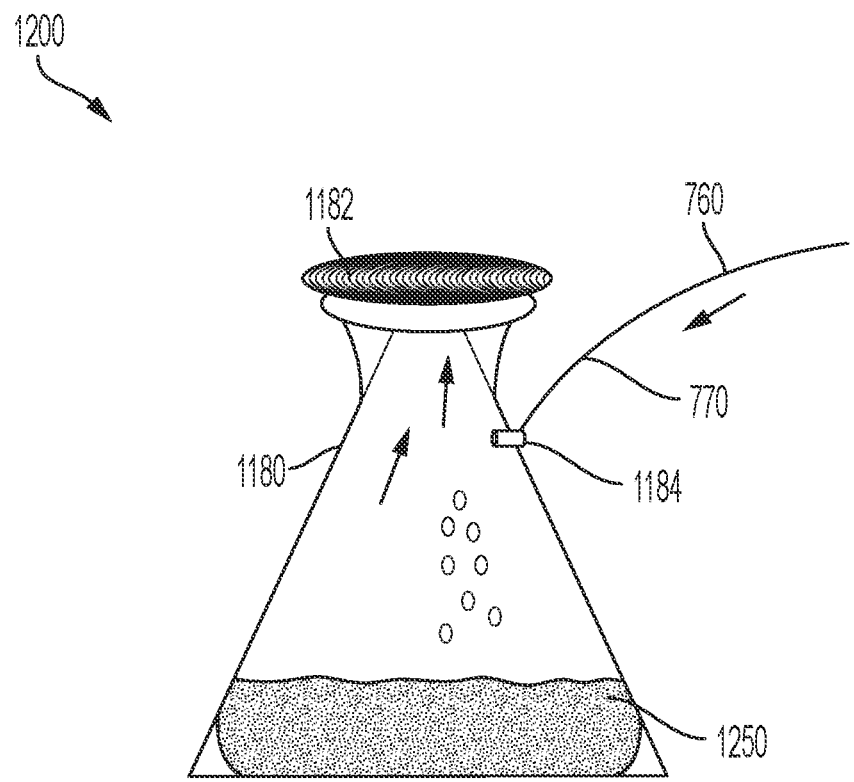
FIG. 12 is a side view of a container of another exemplary embodiment of the device according to the subject disclosure into which residual pressurized fluid and FOAM is deposited for safe disposal.

FIG. 12 illustrates a sealed container 1180 having an inlet 1184 for receiving residual pressurized fluid and/or FOAM from an outlet conduit 760 extending from the outlet passageway of the mouthpiece and in fluid communication with the container. The container 1180 neutralizes any residual pressurized fluid and retains any residual FOAM 1250. For example, if ozone gas is used as the pressurized fluid, the container 1180 can be fitted with a lid 1182 that includes a catalyst or activated carbon which is capable of converting any ozone back to harmless oxygen.

FIG. 13 illustrates disposing of the output fluid 770 from any of the above-described devices via the fluid output conduit 760 connected to a drain fitting 1390 going out a drain 1392 in a home or office. Ozone gas, for example, would be forced down the drain and eventually revert to oxygen. On its way, the FOAM and residual pressurized fluid, might clean the drain as well.

According to another exemplary embodiment of the subject disclosure, the above described devices can further comprise electronic or manually operated controllers to activate the devices, or to allow certain gases or substances to be added in sequence (i.e., a "start sequence") or reduce any pressure of concentration initially. For example, a controller might allow only pressurized air or oxygen to be introduced at first in order to give the user time to prepare for another gas (for example, ozone or nitric oxide), to practice and become accustomed to the sensation of having gas pumped into the mouth before any therapeutic substances and/or toxic gases are added into the incoming stream of pressurized gas and/or to determine if the user is allergic or experiences some negative reaction such as dizziness, headaches, convulsions, burning sensations, sores in the oral cavity, rashes on the face or other parts of the body, blurred vision, etc., to such gas or substances. Such a start sequence will also allow time before each session for the user to arrange and adjust the conduits, mouthpiece, reservoir, and other items as necessary. The start sequence may be timed to allow for dedicated practice sessions using only pressurized air for minutes or hours to give the user multiple tries to become accustomed to the device. When the user is ready, the start sequence may be used to introduce any gas/substances gradually. Similarly, before the session is finished, or if it is paused or stopped for any reason (gagging, for example), all gases and substances can be stopped immediately. Alternatively, some pressurized air or oxygen may continue, allowing for everything in the system to be purged of any such toxic gases such as ozone or other substances from the oral cavity and/or the mouthpiece or outlet before the device is removed.

According to another exemplary embodiment of the subject disclosure, the above described devices can be comprised of a mouthpiece fitted with a lever, button, valve, or the like, which the teeth or lips activate to open the inlet to allow for any gas or substance to enter the oral cavity, such that when the mouthpiece becomes loose or is removed, all gases and substances stop flowing. The inlet gas may also be controlled by a hand-operated switch that, when depressed, allows gas to flow and, when released, cuts off any gas or substance flow. Removal of mouthpiece, or loss of positive pressure in the outlet conduit or third conduit (by use of a sensor), should cut-off any incoming pressurized gas or therapeutic substances automatically for safety purposes. Using a sensor-activated spring to facilitate these actions would be one preferred embodiment of achieving the desired effects.

According to another exemplary embodiment of the subject disclosure, the above described devices can be comprised of a valve to prevent over-pressure and prevent any excessive pressures building up in the oral cavity.

According to another exemplary embodiment of the subject disclosure, the above described devices can be comprised of various designs of the inlets, mouthpiece, lip engaging surfaces, diffuser arrays, and reservoir in such ways as to maximize the comfort of the user; e.g., the inner inlets/secondary conduits may be shaped in the form of bands, tubes, etc., and the mouthpiece and lip sealing surfaces formed of soft pliable materials that conform to the lips and mouth. The inner inlets/secondary conduits can be sized to fit different individuals and color-coded for different members of a family.

According to another exemplary embodiment of the subject disclosure, the above described devices can be comprised of inlets, mouthpiece, lip engaging surfaces, diffuser arrays, inner inlets/secondary conduits, mouthpiece, reservoir, and outlets designed to be permanently connected and sealed to one another. Alternatively, these parts may be separable for purposes of cleaning or repairing each part.

The size of the parts will vary depending upon the size of the user and type and amount of substances added to the pressurized gas.

According to another exemplary embodiment of the subject disclosure, the above described devices can be comprised of a timer, emergency on/off switch, an activating gas/substance flow switch triggered by the lips or teeth contacting the mouthpiece or lip engaging surfaces, GFI safety cut, LED operation and warning lights, and/or emergency air only stream to stop any other gas and/or substance from entering the mouth.

According to another exemplary embodiment of the subject disclosure, the above described devices can be comprised of a mouthpiece and/or reservoir made with see-through materials in order to see the substances and their level in the mouthpiece and/or reservoir. The mouthpiece or reservoir can be made into any shape, for example, run up along one or both sides of the face and/or up to and behind the ears and fitted with straps or head gear to keep it in place depending upon whether the user is reclining or sitting up, so long as it works to trap and return the FOAM back into the mouth and release any RPF and/or residual FOAM.

According to another exemplary embodiment of the subject disclosure, the above described devices can be comprised of a gauge to measure the level of ozone concentration.

According to another exemplary embodiment of the subject disclosure, the above described devices can be comprised of a supplemental attachment of a nasal cannula or attachment (preferably connected to the mouthpiece) which provides a very slight positive level of pressurized ambient air or oxygen to prevent any inadvertent ozone or nitric oxide gas, or any other toxic gas, from seeping into the nasal passages or being inhaled.

According to another exemplary embodiment of the subject disclosure, the above described devices can used in a room well-ventilated or fitted with a fan to move the ambient air around.

According to another exemplary embodiment of the subject disclosure, the above described devices can be comprised of a suction or scavenging system for people who, under special circumstances, require a vacuum or suction to remove any gas or substances from the oral cavity. Normally, as mentioned above, no suction or vacuum is required. However, under certain circumstances, such a system may be helpful, for example, when the patient is incapacitated, delirious, weak, unable to rise or sit up, or for any other reason is unable to maintain a seal on the mouthpiece. Under such circumstances, a dedicated conventional dental suction conduit may be connected to the device, in which case, the mouthpiece and/or outlets may be operated in "suction mode" if necessary.

According to another exemplary embodiment of the subject disclosure, the above described devices can be comprised of a mouthpiece fitted with a grip to hold the device in place when moving around.

According to another exemplary embodiment of the subject disclosure, the above described devices can be comprised of accessories to mount the device permanently or temporarily on a wall, for example, over a sink.

According to another exemplary embodiment of the subject disclosure, the above described devices can be comprised of accessories to operate the present invention in such a manner as to allow the user to use the device for relaxation, facial treatments, stress reduction, massage, muscle spasm reduction, etc.

According to another exemplary embodiment of the subject disclosure, the above described devices can be comprised of a sensor to detect nitric acid and/or other dangerous chemicals or metabolites which can damage the teeth, gum, and/or other tissues in the oral cavity or body.

Central to the subject disclosure is that the devices can be used without risk of inhaling any noxious gases (such as ozone) during operation. The body acts instinctively and naturally to seal the oral cavity from the nasal passages, nose, etc., when the devices are being used. Fortunately, the human body is adapted to breathing through the nose while the oral cavity is either full or commanded to do so by the brain and to isolate the mouth from the nasal and breathing passages. The body automatically seals the pressurized fluid, whether liquid or gas. and FOAM on its own due to reflex actions of the nerves and muscles of the mouth, throat, neck, and breathing passages which coordinate to isolate and block off all breathing pathways connected to the oral cavity, and at the same time, allows the user to breathe normally through the nose while allowing the mouth to be full of substances which can include pressurized therapeutic fluid and/or FOAM.

The oral cavity, thus sealed by the combination of a user's inherent reflexes and the device's mouthpiece, traps any pressurized fluid and/or FOAM and allows time for such substances to dissolve deep into all the tissues of the user's oral cavity, including the gum and periodontal pockets, tongue, and the front and back of the mouth and part of the throat, etc., and to allow the user to swirl the contents around the oral cavity as some of these substances exit the mouth through the mouthpiece, all without the need for any suction device or anyone to operate one.

Specifically, in the dental field, the device according to the present invention can prevent, treat, and restore damaged tissues, help prevent decay and infections due to restorations, dentures, implants, surgical areas, kill dangerous pathogenic bacteria responsible for tooth decay and periodontal disease, and prevent such chronic diseases from occurring in the first place in a manner unlike any other presently available technologies. A novelty of the present invention lies in its ability to pressurize and saturate the entire oral cavity—the teeth, gums, the base of the gums and along the floor of the mouth, inner cheeks, tongue, and roof of the mouth with ozone gas, ozonated water, and/or another fluid and FOAM so that they, acting independently or together, depending upon the course of therapy selected by the user, can eradicate pathogenic microbes, dissolve their biofilm, and even destroy remaining planktonic bacteria which are floating around deep in the tissues or freely in the mouth (and often set loose during deep cleanings or restoration procedures). Oxidative fluids such as ozonated water, air, oxygen, and/or ozone gas can destroy cariogenic bacteria quickly. The subject disclosure also enables a user to supply pressurized oxygen and/or ozone or other gas, as well as any other fluids, to the oral cavity over an extended period of time, thereby enabling the fluid to reach further and deeper into the supporting teeth and periodontal structures at all points in the oral cavity. It can reach all points practically simultaneously, and more so than any other current oxygen or ozone-based oxidative therapy.

According to some exemplary embodiments, the aforementioned devices can be used with various pressurized therapeutic fluids including water (which may be mixed with hydrogen peroxide or other substances), ozonated water, or various pressurized gases including oxygen, filtered ambient or dried air, ozone, nitric oxide, etc. In some exemplary embodiments, such pressurized therapeutic fluids and/or FOAM may be combined in series, mixed, recirculated and/or recycled back into the oral cavity, thereby preserving beneficial effects of keeping saliva and any such therapeutic substances in the mouth for a longer period of time. As concerns the use of pressurized air or oxygen gas, currently available technologies could use oxygen. However, none of them are capable of insufflating the entire oral cavity nor mix the gas with other substances (saliva, hydrogen peroxide, medications, remineralization formulas, etc.).

According to some exemplary embodiments, the aforementioned devices are designed to mix pressurized gas with saliva. Current ozone dental technologies do not utilize this approach. However, research shows that saliva is truly a miracle of nature. It fights germs, neutralizes harmful acids, wipes away waste products, debris, and bacteria. Saliva also forms a protective healthy barrier around oral tissues and supplies proteins (such as the pellicle) which traps free-floating planktonic bacteria. It provides minerals that protect tooth enamel (notably calcium and phosphate ions that re-mineralize teeth), and it prevents tooth decay and gum disease. It helps heal wounds and regenerate structures by supplying epidermal and vascular endothelial growth factors. Current technologies fail to take advantage of saliva's benefits. For example, washing saliva away when using ozonated water with current technologies to irrigate a periodontal pocket or an area after an extraction and suctioning away all fluids in the mouth, is compromising one of the body's greatest oral cavity natural assets. By contrast, the present invention according to some embodiments actually stimulates the healing powers of saliva and is designed to recycle it.

Preferably, the mouthpiece, lip sealing surfaces, flanges, and membranes used in the embodiments according to the present invention can be made in such a way as to be somewhat elastic and designed to return to their original shape against the lips so that it is easier for the lips to form a seal as the user is opening and moving the mouth and jaw during the water flossing operation. Preferably the mouthpiece, lip sealing surfaces, and flanges should be able to seal against the lips in such a way that even though the mouth is opened a little, perhaps as it moves around, a seal is maintained as the user manipulates the water flosser instrument. In other words, it would be difficult to use the water flossing instrument if the user had to be pressing down with the lips against the mouthpiece and/or lip sealing surfaces because this would restrict freedom of movement.

The above-described mouthpieces, including the lip engaging surfaces, flanges, membranes, inlets/secondary conduits, as well as the inlet conduits, the outlet conduits, etc., can be made of soft, flexible, hypoallergenic, medical-grade silicone or similar materials. According to an exemplary embodiment, the mouthpiece includes a flexible membrane inlet made of materials which help seal a water flosser instrument, but also allow the instrument, after it has been inserted, to slide back and forth to enable the user to reach all the teeth and gums. In one embodiment according to the present invention, the inlet can be composed of a circle of tiny fibers which form a barrier to retain the pressurized fluid, but allow the water flosser instrument to move back and forth easily. Preferably, the mouthpiece membrane, which seals the inlet, according to one embodiment of the present invention, is flexible, but sturdy and elastic, so as to withstand being stretched many times during the lifetime of the water flosser machine.

Additionally, when the device is used in connection with a water flosser, the flexible membrane can be made of an elastic fine mesh which is intertwined in a manner so as to have many tiny spaces and pores to allow the water flosser instrument to be inserted into the membrane, but upon exiting it, due to the elastic properties of the fine mesh, closes up again, and returns to its original shape with the same sealing properties. The mesh may be made of any suitable material and design, synthetic or natural. Such a design would allow the user to insert the water flosser instrument in different areas (top, bottom, left, or right, for example) of the membrane to reach teeth and gums easily. The mesh and pores should be fine and small enough to allow some air to pass through, but not so large as to allow any pressurized fluids from passing through.

Additionally, the mouthpiece, lip engaging surfaces or structures, flanges, membrane, inlet conduit, outlet conduit, etc., can all be custom-made to fit an individual user's lips, mouth, teeth and other structures of the oral cavity. Also, if the diameter of conventional water flosser instruments change (i.e., bigger or smaller), the inlet sealing materials can be adjusted to accommodate such changes.

Furthermore, the mouthpieces should be made in such a way as to minimize muscle fatigue of the lips and jaw. Generally, the flatter the mouthpiece (as opposed to a more tubular shape) causes less fatigue because it follows the natural shape of the lips, muscles, and jaw.

In addition, the mouthpiece and/or the reservoir can carry biosensors. According to an exemplary embodiment, one biosensor can be attached to a mouthpiece on the inside the mouth while another can be placed outside in contact with the user's skin on the cheek. The biosensors monitor various health markers, including minerals and chemicals, pH, temperature, metabolites, biomarkers, vitamins, metabolic and stress hormones, inflammatory markers, oxidation levels, heavy metals, microbes and viruses of all kinds, nitric oxide levels and other gas concentrations in the body (such as oxygen levels), and/or bodily fluids such as saliva, blood, and/or inflammatory fluids. At the beginning and during each session, the biosensor(s) can collect such data and send the information by wireless transmission. The biosensors are small but contain all the electronics and batteries necessary for keeping and wirelessly transmitting the data. In other words, the biosensor is selected from the group consisting of a mineral sensor, a chemical sensor, a pH sensor, a temperature sensor, a metabolite sensor, a biomarker sensor, a vitamin sensor, a metabolic sensor, a stress hormone sensor, an inflammatory marker sensor, an oxidation level sensor, a heavy metal sensor, a microbe sensor, a virus sensor, a gas concentration sensor, a saliva sensor, a blood sensor, and an inflammatory fluid sensor.

The subject disclosure additionally contemplates a method for delivering a therapeutic substance to an oral cavity of a user. The method generally comprises the steps of fitting a mouthpiece to a mouth of a user to seal the oral cavity of the user, delivering a therapeutic fluid under pressure to the mouthpiece via a first conduit coupled to the mouthpiece such that the fluid enters the oral cavity of the user, and draining the therapeutic fluid under pressure from the oral cavity via a second conduit coupled to the mouthpiece. According to an aspect, the method further comprises mixing saliva drained from the oral cavity with therapeutic fluid and delivering the admixture to the oral cavity through the second conduit. According to an aspect, the method further comprises providing a reservoir coupled to the mouthpiece and having an outlet disposed above the mouthpiece.

The devices and methods according to the subject disclosure administer pressurized therapeutic fluids directly into the user's oral cavity to permeate the entire mouth. The fluids preferably provide a therapeutic, oxidative, and antimicrobial effect in order to prevent and treat oral diseases, restore the normal balance of the oral microbiota, heal damaged tissues, stimulate the subject's immune system, and restore function in other parts of the human body.

Use of the devices and methods disclosed herein for homecare is very valuable. Anyone trained in their use can improve oral hygiene, remove plaque and pathogenic bacteria, and reduce infections and inflammation on a daily basis or as needed. This is especially helpful for everyone in between dental office visits because keeping the oral microbiota balanced and free of acid-causing tooth decay and gum disease is necessary to stop the runaway levels of such oral diseases. Notably, aerobic bacteria (characterized as the initial plaque-forming bacteria) and "commensal" bacteria (which form the second layer of plaque) are not overly susceptible to lower levels of ozone. But, the anaerobic bacteria, the ones mainly responsible for creating the acids and lowering the pH in the mouth, are very susceptible to oxygen and ozone. The present invention allows the user to control all of these parameters with ease. Restoring bacterial balance in the oral cavity is the goal.

Tests of daily use of the devices and methods according to the subject disclosure show that time-extended sessions (operating the device for 20 minutes or more) can saturate the oral cavity with oxygen and/or ozone, and these fluids are absorbed into the tissues, including the gums, periodontal pockets, and even to the surface of the cheeks-further destroying pathogenic bacteria and their colonies, while leaving the oxygen-thriving natural biome of the oral cavity largely in healthy condition. Fortunately, most of the nitric oxide-producing bacteria are at the back of the dorsal surface of the tongue (upper back towards the throat) which can easily be shielded, if desired, by the tongue during operation of the present invention. Higher and higher concentrations of ozone and other gases may also disrupt the nitric oxide-producing bacteria, so by varying the amount and concentration of such gases, one can meter the dose accordingly. Studies also show that eradicating oral pathogenic bacteria greatly reduces the likelihood of systematic infections and inflammation throughout the body (heart, brain, liver, etc.). For example, studies show that oral pathogenic bacteria are found in atherosclerotic plaques and responsible for heart disease. The devices and methods according to the subject disclosure may also be used for a variety of therapies in the medical field for systemic oxidative therapy to rejuvenate tissues in the head, face, eyes, brain, etc.

Use of the devices and methods according to the subject disclosure can also be helpful for immunocompromised patients who suffer from throat or neck cancer and receive chemotherapy or radiation, or who have oral ulcers and who find it too painful to brush. A full-month oxidative (perhaps using oxygen, ozone, nitric oxide, etc.) therapy using the present invention would be very helpful and it will help relieve pain for these patients as well. Such therapies have been used to relieve pain and restore function of those with joint pain, such as temporomandibular joint ("TMJ") disorders sufferers. Such sufferers may find that even the action of the FOAM microbubbles can create a kind of massage of the gums and help restore circulation. The ability of being able to vary the pressure, concentration, and flow rates of such pressurized fluid, whether ozonated water, ozone gas, nitric oxide, hydrogen peroxide fluid, as well as the FOAM that the gases create with the present invention, adds a lot of flexibility to the oxidative therapy and adds a greater saturation of tissues with oxygen and ozone and potential for ozonides to circulate deep within the tissues and bloodstream will be very good to prevent and treat all manner of oral diseases.

It will be appreciated by those skilled in the art that changes could be made to the exemplary embodiments described above without departing from the broad inventive concept thereof. It is to be understood, therefore, that this disclosure is not limited to the particular exemplary embodiments disclosed, but it is intended to cover modifications within the spirit and scope of the subject disclosure as defined by the appended claims.

What is claimed is:

1. A device for delivering a therapeutic gas to an oral cavity of a user comprising:
    a source of pressurized therapeutic gas; and
    a mouthpiece having:
        a posterior facing end for aligning with a front of a user's oral cavity, and
        a body extending from the posterior facing end, the body having:
            a lip engaging surface for sealing the oral cavity from an external environment when the lip engaging surface is engaged by a user's lips,
            an inlet passageway coupled to the source of pressurized gas, the inlet passageway extending through the body and in gas communication with the posterior facing end for delivering the pressurized therapeutic gas to the oral cavity, such that a positive pressure with respect to ambient is maintained by the therapeutic gas in the oral cavity when the oral cavity is sealed from the external environment by a user's lips in engagement with the lip engaging surface,
        an outlet passageway extending through the body and in gas communication with the posterior facing end for enabling egress of the pressurized therapeutic gas from the oral cavity when the oral cavity is sealed from the external environment by a user's lips in engagement with the lip engaging surface, and
        an inlet conduit coupled to the inlet passageway and beyond a surface of the posterior facing end, said inlet conduit including a plurality of spaced apart gas diffuser holes in gas communication with the inlet passageway, such that a foamy mixture of gas and liquid bubbles is created in the oral cavity when said gas diffuser holes are immersed in liquid in the oral cavity.

2. The device of claim 1, wherein the lip engaging surface includes a recess for receiving each of a user's lips to provide a gas seal when the user's lips are received in the recess.

3. The device of claim 1, wherein the mouthpiece further comprises a bite plate extending from the posterior facing end.

4. The device of claim 1, wherein the body tapers in an anterior direction.

5. The device of claim 1, wherein the mouthpiece includes a plurality of holes each in gas communication with the inlet passageway for enabling the therapeutic gas to be directed to a plurality of areas in the oral cavity.

6. The device of claim 1, wherein the mouthpiece includes a gas diffuser array in gas communication with the inlet passageway.

7. The device of claim 6, wherein the gas diffuser array includes a first diffuser having primary diffuser holes and a second diffuser having secondary diffuser holes having an overall diameter that is smaller than the primary diffuser holes.

8. The device of claim 1, wherein the inlet conduit includes a plurality of secondary conduits for delivering therapeutic gas to a plurality of areas in the oral cavity.

9. The device of claim 1, wherein the body is a hollow body having an insert plug removably received in the hollow body, and wherein the inlet passageway and the outlet passageway are provided in the insert plug.

10. The device of claim 1, further comprising a reservoir extending from the mouthpiece exterior of said oral cavity and said lip engaging surface and in gas communication with the outlet passageway for permitting the foamy mixture of gas and liquid bubbles to flow from the oral cavity to the reservoir and for enabling at least some of the foamy mixture in the reservoir to coalesce back into liquid and to flow from the reservoir back into the oral cavity under the influence of gravity.

11. The device of claim 10, wherein the reservoir includes an outlet for discharging therapeutic gas and liquid received from the oral cavity.

12. The device of claim 10, wherein the reservoir extends from the mouthpiece in a direction along a user's cheek.

13. The device of claim 10, wherein the reservoir includes an inlet for receiving a liquid.

14. The device of claim 10, further comprising a biosensor carried by at least one of the mouthpiece and the reservoir.

15. The device of claim 14, wherein the biosensor is selected from the group consisting of a mineral sensor, a chemical sensor, a pH sensor, a temperature sensor, a metabolite sensor, a biomarker sensor, a vitamin sensor, a metabolic sensor, a stress hormone sensor, an inflammatory marker sensor, an oxidation level sensor, a heavy metal sensor, a microbe sensor, a virus sensor, a gas concentration sensor, a saliva sensor, a blood sensor, and an inflammatory gas sensor.

16. The device of claim 1, wherein the source of pressurized therapeutic gas comprises:
 a therapeutic gas generator; and
 a pump operatively in communication with the therapeutic gas generator for pressurizing the therapeutic gas.

17. The device of claim 1, further comprising:
 a container having a lid that includes a catalyst or activated carbon, and
 wherein the mouthpiece further comprises an outlet conduit extending from the outlet passageway and in communication with the container.

18. The device of claim 1, wherein the therapeutic gas is selected from the group consisting of air, oxygen, ozone, nitric oxide gas, and combinations thereof.

19. The device of claim 1, wherein the plurality of spaced apart gas diffuser holes are fitted into the mouthpiece and aimed at the teeth and gums.

20. A method for delivering a therapeutic gas to an oral cavity of a user comprising:
 fitting a mouthpiece to a mouth of a user to enable the lips of the user to seal the oral cavity of the user from an external environment, wherein the mouthpiece has a posterior facing end;
 delivering a therapeutic gas under pressure to the mouthpiece via a first conduit coupled to the mouthpiece such that the gas enters the oral cavity of the user via an inlet conduit that extends beyond a surface of the posterior facing end, said inlet conduit including a plurality of spaced apart gas diffuser holes in gas communication with the first conduit, said gas diffuser holes sized to cause a foamy mixture of gas and liquid bubbles to be created in the oral cavity when said gas diffuser holes are immersed in liquid in the oral cavity and said gas is exiting the diffuser holes, and such that the gas maintains a positive pressure with respect to ambient in said oral cavity; and
 causing the therapeutic gas to exit under pressure from the oral cavity via a second conduit coupled to the mouthpiece at a rate that enables the positive pressure in the oral cavity to be maintained.

21. The method of claim 20, wherein the liquid in said oral cavity comprises the user's saliva.

22. The method of claim 21, further comprising providing a reservoir coupled to the second conduit exterior to said mouthpiece for enabling the foamy mixture of gas and liquid bubbles to flow from the oral cavity to the reservoir and for enabling at least some of the foamy mixture in the reservoir to coalesce back into liquid and to flow from the reservoir back into to the oral cavity under the influence of gravity, said reservoir further having an outlet disposed above the mouthpiece for enabling the pressurized therapeutic gas to flow out of the reservoir, said reservoir further including an inlet for enabling the user to add liquid to the reservoir and, thereby, to said oral cavity, such that said foamy mixture is enabled to continue to be created in said oral cavity by said gas exiting the diffuser holes.

23. The method of claim 20, wherein the therapeutic gas is selected from the group consisting of air, oxygen, ozone, nitric oxide gas, and combinations thereof.

24. The method of claim 20, wherein a user's sensation of the foamy mixture of gas and liquid bubbles in the mouth stimulates the user's reflexes to close off the airway to the lungs and nasal cavity and seal the oral cavity.

25. A device for delivering a therapeutic gas to an oral cavity of a user comprising:
 a source of therapeutic gas and a pump for pressurizing the therapeutic gas; and
 a mouthpiece having:
  a posterior facing end for aligning with a front of a user's oral cavity, and
  a body extending from the posterior facing end, the body having:
   a lip engaging surface for sealing the oral cavity from an external environment when the lip engaging surface is engaged by a user's lips, wherein the lip engaging surface includes a recess for receiving each of the user's lips to provide a fluid seal when the user's lips are received in the recess,
   an inlet passageway coupled to the source of pressurized gas, the inlet passageway extending through the body and in gas communication with the posterior facing end for delivering pressurized therapeutic gas to the oral cavity, such that a positive pressure with respect to ambient is maintained by the therapeutic gas in the oral cavity when the oral cavity is sealed from the external environment by a user's lips in engagement with the lip engaging surface,
   an inlet conduit extending from the inlet passageway and in gas communication with the source of pressurized therapeutic gas, wherein the inlet conduit extends beyond a surface of the posterior facing end and includes a plurality of spaced apart gas diffuser holes in gas communication with said inlet conduit, such that a foamy mixture of gas and liquid bubbles is created in the oral cavity when said gas diffuser holes are immersed in liquid in the oral cavity, and an outlet passageway extending through the body and in gas communication with the posterior facing end for enabling egress of the pressurized therapeutic gas from the oral cavity when the oral cavity is sealed from the external environment by a user's lips in engagement with the lip engaging surface.

26. The device of claim 25, further comprising:
a reservoir coupled to the mouthpiece exterior of said oral cavity and said lip engaging surface, wherein the outlet passageway permits the foamy mixture of gas and liquid bubbles in the oral cavity to flow from the oral cavity to the reservoir and for enabling at least some of the foamy mixture in the reservoir to coalesce back into liquid and to flow gas mixed with liquid from the oral cavity to flow from the reservoir back into the oral cavity under the influence of gravity, and wherein the reservoir has an outlet disposed above the mouthpiece for enabling the pressurized therapeutic gas and liquid from the oral cavity to flow out of the reservoir, wherein the reservoir includes a second inlet for receiving a liquid, and wherein the therapeutic gas is selected from the group consisting of air, oxygen, ozone, nitric oxide gas, and combinations thereof.

27. The device of claim 26, further comprising a biosensor carried by at least one of the mouthpiece and the reservoir.

* * * * *